US008750624B2

(12) United States Patent
Kletter

(10) Patent No.: US 8,750,624 B2
(45) Date of Patent: Jun. 10, 2014

(54) DETECTION OF DUPLICATE DOCUMENT CONTENT USING TWO-DIMENSIONAL VISUAL FINGERPRINTING

(76) Inventor: Doron Kletter, San Mateo, CA (US)

( * ) Notice: Subject to any disclaimer, the term of this patent is extended or adjusted under 35 U.S.C. 154(b) by 649 days.

(21) Appl. No.: 12/907,226

(22) Filed: Oct. 19, 2010

(65) Prior Publication Data

US 2012/0093421 A1 Apr. 19, 2012

(51) Int. Cl.
G06K 9/62 (2006.01)
G06K 9/54 (2006.01)
G06K 9/00 (2006.01)

(52) U.S. Cl.
CPC ........ G06K 9/00463 (2013.01); G06K 9/00483 (2013.01)
USPC .......................................... 382/209; 382/306

(58) Field of Classification Search
USPC ......... 382/306, 209, 100, 173, 181, 190, 217, 382/218, 224
See application file for complete search history.

(56) References Cited

U.S. PATENT DOCUMENTS

| 5,465,303 | A |   | 11/1995 | Levison et al. |
|---|---|---|---|---|
| 5,465,353 | A |   | 11/1995 | Hull et al. |
| 5,491,760 | A |   | 2/1996 | Withgott et al. |
| 5,613,014 | A |   | 3/1997 | Eshera et al. |
| 5,850,476 | A |   | 12/1998 | Chen et al. |
| 5,893,908 | A |   | 4/1999 | Cullen et al. |
| 5,987,171 | A | * | 11/1999 | Wang ........................... 382/173 |
| 6,041,133 | A |   | 3/2000 | Califano et al. |
| 7,359,532 | B2 |   | 4/2008 | Acharya et al. |
| 7,609,914 | B2 | * | 10/2009 | Hirai ............................. 382/305 |
| 7,844,594 | B1 |   | 11/2010 | Holt et al. |
| 8,086,039 | B2 |   | 12/2011 | Kletter |
| 2006/0104484 | A1 |   | 5/2006 | Bolle et al. |
| 2006/0251339 | A1 |   | 11/2006 | Gokturk et al. |
| 2006/0259524 | A1 |   | 11/2006 | Horton |
| 2006/0285772 | A1 |   | 12/2006 | Hull et al. |
| 2007/0019864 | A1 |   | 1/2007 | Koyama et al. |
| 2007/0022072 | A1 |   | 1/2007 | Kao et al. |
| 2008/0175484 | A1 |   | 7/2008 | Hartmann et al. |
| 2008/0219560 | A1 |   | 9/2008 | Morimoto et al. |
| 2008/0317278 | A1 |   | 12/2008 | Lefebvre et al. |
| 2009/0176566 | A1 |   | 7/2009 | Kelly |
| 2009/0324026 | A1 |   | 12/2009 | Kletter |
| 2009/0324087 | A1 |   | 12/2009 | Kletter |
| 2009/0324100 | A1 |   | 12/2009 | Kletter |
| 2011/0052015 | A1 |   | 3/2011 | Saund et al. |
| 2011/0173103 | A1 |   | 7/2011 | Batra et al. |
| 2011/0197121 | A1 |   | 8/2011 | Kletter |
| 2012/0093354 | A1 |   | 4/2012 | Kletter |

FOREIGN PATENT DOCUMENTS

EP 1850270 A1 10/2007

OTHER PUBLICATIONS

"Workshare Professional", Mar. 29, 2009, pp. 1-2, http://web.archive.org/web/20090329082245/http://www.workshare.com/products/wsprofe . . . .
Acrobat Professional, Adobe Systems Inc., Nov. 28, 2009, http://web.archive.org/web/20091128011910/http://www.adobe.com/products/acrobatpro/.
Baumberg, "Reliable Features Matching across Widely Separated Views" in Conference on Computer Vision and Pattern Recognition, vol. 1, pp. 774-781, 2000.
Brown et al., "Invariant Features from Interest Point Groups." in British Machine Vision Conference, BMVC 2002, Cardiff, Wales, pp. 656-665 (here typed as 253-262), Sep. 2002.

(Continued)

Primary Examiner — Yon Couso
(74) Attorney, Agent, or Firm — Fay Sharpe LLP

(57) ABSTRACT

A system and method of detecting duplicate document content in a large document collection and automatically highlighting duplicate or different document content among the detected document content using two-dimensional visual fingerprints.

19 Claims, 13 Drawing Sheets

(56) References Cited

OTHER PUBLICATIONS

Carneiro et al., "Multi-Scale Phase-based Local Features" in Conference on Computer Vision and Pattern Recognition, vol. 1, pp. 736-743, 2003.
Compare PDF, AKS Labs, Oct. 12, 2004, http://web.archive.org/web/20041012041 34://http://www.compare-pdf.com/.
Diff PDF, AJD Software, Jan. 24, 2006; http://www.supershareware.com/diff-pdf-free/software/.
Eddins, Steve, "Intensity-Weighted Centroids", The Mathworks, Aug. 31, 2007, pp. 1-4, http://blogs.mathworks.com/steve/2007/08/31/itensity-weighted-centroids.
Florack et al., "General intensity transformations and differential invariants," in Journal of Mathematical Imaging and Vision, vol. 4, No. 2, pp. 171-187, May 1994.
Freeman et al., "The Design and Use of Steerable Filters" Transactions on Pattern Analysis and Machine Intelligence, vol. 13, pp. 891-906, 1991.
Harris et al., "A Combined Corner and Edge Detector." Proceedings of the Alvey Vision Conference, pp. 147-151, 1988.
Iwamura et al., Improvement of Retrieval Speed and Required Amount of Memory for Geometric Hashing by Combining Local Invariants, Osaka Prefecture University, Japan, 10 pages, Proc. BMVC2007 (Sep. 2007).
Kadir et al., "An Affine Invariant Salient Region Detector." Computer Vision—ECCV 2 004, pp. 228-241.
Nakai et al., Camera-Based Document Image Retrieval as Voting for Partial Signatures of Projective Invariants, Graduate School of Engineering, Osaka Prefecture University, Japan, Proceedings of the 2005 Eight International Conference on Document Analysis and Recognition (ICDAR'05) 2005 IEEE, 5 pages.
Kletter, Finding similar content in a mixed collection of presentation and rich document content using two-dimensional visual fingerprints, U.S. Appl. No. 12/907,251, filed Oct. 19, 2010.
Learn Acrobat 9—Comparing two PDF documents / Adobe TV, Dec. 20, 2009, pp. 1-8, http://web.archive.org/web/20091220080445/http://tv.adobe.com/watch/learn/-acrobat-9/co . . . .
Ledwich et al., "Reduced SIFT Features for Image Retrieval and Indoor Localization." IEEE Transaction on Pattern Analysis and Machine Intelligence, vol. 19, No. 5, May 1997.
Lepetit et al., "Randomized Trees for Keypoint Recognition." Proceedings IEEE Computer Society Conference on Computer Vision and Pattern Recognition CVPR05, vol. 2, pp. 775-781, 2005.
Lepetit et al., "Keypoint recognition using randomized trees", IEEE-PAMI, vol. 28, No. 9, pp. 1465-1479,Sep. 2006.
Lepetit et al., "Point Matching as a Classification Problem for Fast and Robust Object Pose Estimation." in Conference on Computer Vision, pp. 128-142, Copenhagen, 2002.
Lepetit et al., "Towards Regognizing Feature Points using Classification Trees." Technical Report IC/2004/74 EPFL, 2004.
Lindeberg et al., "Feature Detection with Automatic Scale Selection." International Journal of Computer Vision, vol. 30, No. 2, pp. 79-116, 1998.
Lowe, "Distinctive Image Features from Scale-Invariant Keypoints." International Journal of Computer Vision, vol. 60, No. 2, pp. 91-110, 2004.
Mikolajczyk et al., "A performance Evaluation of Local Descriptors." in Conference on Computer Vision and Pattern Recognition, pp. 257-263, Jun. 2003, (paper shows a draft date of Feb. 23, 2005).
Mikolajczyk et al., "An Affine Invariant Interest Point Detector." in European Conference on Computer Vision and Pattern Recognition, vol. 1, pp. 128-142, 2002.
Nakai et al., Hashing with Local Combinations of Feature Points and Its Application to Camera-Based Document Image Retrieval—Retrieval in 0.14 Second from 10,000 Pages—, Graduate School of Engineering, Osaka Prefecture University, Japan, pp. 87-94, Proc. First International Workshop on Camera-Based Document Analysis and Recognition (CBDAR2005), pp. 87-94 (Aug. 2005).
Nakai et al., Use of Affine Invariants in Locally Likely Arrangement Hashing for Camera-Based Document Image Retrieval, Graduate School of Engineering, Osaka Prefecture University, Japan, pp. 1-12, Lecture Notes in Computer Science (7th International Workshop DAS2006), 3872, pp. 541-552 (Feb. 2006).
Neuwirth et al., "Flexible Diff-ing in a collaborative Writing System," Carnegie Mellon University, Pittsburgh, PA 15213, CSCW 92 Proceedings November, pp. 147-154, 1992.
Nuance, Comparing PDF Documents, 2002-2010 Nuance Communications, Inc., Jul. 7, 2009, pp. 1-2.
Pilet et al., "Fast Non-Rigid Surface Detection, Registration and Realistic Augmentation." International Journal of Computer Vision, Springer 2007.
Schaffalitzky et al., "Multi-View Matching for Unordered Image Sets or How do I Organize My Holiday Snaps" in European Conference on Computer Vision, vol. 1, pp. 414-431, 2002.
Schmid et al., "Local Greyvalue Invariants for Image Retrieval." IEEE Transaction on Pattern Analysis and Machine Intelligence, vol. 19, No. 5, May 1997.
Vaibhac, Compare Documents Side-By-Side in Excel and Word, Apr. 9, 2008, pp. 1-2.
Viola et al., "Rapid object detection using a boosted cascade of simple features." in Proceedings of Computer Vision and Pattern Recognition CVPR, vol. I, pp. 511-518, 2001.
Workshare Professional, WorkShare Inc., Apr. 15, 2005, http://web.archive.org/web/20050415102858/http://www.workshare.com/products/wsprofessional/.
Yan Ke et al., "PCA-SIFT: A More Distinctive Representation for Local Image Descriptors." in Conference on Computer Vision and Pattern Recognition, pp. 111-119, 2000.
"AJC Diff", Jun. 19, 2008, http://web.archive.org/web/20080619081259/http://www.ajcsoft.com/ProductsAJCDiff.php.
"Business Collaboration", Jan. 16, 2008, pp. 1-2, http://web.archive.org/web/20080116032852/http://web.exostar.com/solutions/collaborati . . . .
Eisenberg, A. "The Magnifying Glass Gets an Electronic Twist". May 25, 2008, http://www.nytimes.com/2008/05/25/technology/25novel.html?r=3&ref=technology&oref=slogin&oref=slogin&oref=slogin 2 pages.
Gengembre et al., "The Orange Labs Real Time Video Copy Detection System—TrecVid 2008 Results", Oct. 27, 2008, retrieved from the Internet: http://www-nlpir.nist.gov/projects/tvpubs/tv8.papers/orangelabs.pdf (retrieved on Feb. 22, 2013).
Potthast et al., "Cross-Language Plagiarism Detection, Language Resources and Evaluation", Springer Netherlands, Dordrecht, vol. 45, No. 1, Jan. 30, 2010, pp. 45-62.
Ramachandrula et al., "PaperDiff: A Script Independent Automatic Method for Finding the Text Differences Between Two Document Images", Document Analysis Systems, 2008; DAS '08, the 8th IAPR Int'l Workshop ON, IEEE, Piscataway, NJ, US, Sep. 16, 2008, pp. 585, 590.
Lorenz et al., "Automatic Indexing for Storage and Retrieval of Line Drawings", Int'l Society for Optical Eng'g, US, vol. 2420, Feb. 9, 1995, pp. 216-227.
EP Search Report, corresponding EP Appl. No. 11184495.7, Mailed Mar. 1, 2013, Completed Feb. 22, 2013, The Hague.
GW Micro-Catalog-Magnifiers—Portable SenseView Duo, obtained from the Internet Sep. 2, 2009, at https://www.gwmicro.com/Catalog/Magnifiers/?moreInfo=8131-001-Duo 1 page.
GW Micro-Catalog-Magnifiers—Portable SenseView P430, obtained from the Internet Sep. 2, 2009, at https://www.gwmicro.com/Catalog/Magnifiers/?moreInfo=8131-001 1 page.
QuickLook Classic, obtained from the Internet Sep. 2, 2009, at http://www.freedomvision.net/1%20QuickLook%20Basic.html 3 pages.
QuickLook Focus, obtained from the Internet Sep. 2, 2009, at http://www.freedomvision.net/1%20QuickLook%20Focus.html 3 pages.
QuickLook, obtained from the Internet Sep. 2, 2009, at http://www.freedomvision.net/1%20QuickLook.html 2 pages.

\* cited by examiner

DETECTION OF DUPLICATE DOCUMENT CONTENT USING TWO-DIMENSIONAL VISUAL FINGERPRINTING

INCORPORATION BY REFERENCE

U.S. patent application Ser. No. 12/147,624 (20080166-US-NP), titled: METHOD AND SYSTEM FOR FINDING A DOCUMENT IMAGE IN A DOCUMENT COLLECTION USING LOCALIZED TWO-DIMENSIONAL VISUAL FINGERPRINTS, by, Kletter, Saund, Janssen, and Atkinson.

U.S. patent application Ser. No. 12/147,867 (20080302-US-NP), titled: SYSTEM AND METHOD FOR FINDING STABLE KEYPOINTS IN A PICTURE IMAGE USING LOCALIZED SCALE SPACE PROPERTIES by Kletter.

U.S. patent application Ser. No. 12/163,186 (20080303-US-NP), titled: METHOD FOR FINDING A PICTURE IMAGE IN AN IMAGE COLLECTION USING LOCALIZED TWO-DIMENSIONAL VISUAL FINGERPRINTS by Kletter.

BACKGROUND

This application is directed to document content detection, and more particularly to finding duplicate and near duplicate document content in a large collection of documents. In addition, this application provides a method for automatically highlighting the difference and/or similarities in a visually compelling and easy to see by a human observer.

One area where the present concepts can be applied is in the review of a large number of documents, such as in the context of litigation discovery. A typical litigation case may involve millions of documents containing multiple copies and versions of revised document content. The litigation documents may contain electronic and scanned hardcopy versions obtained from multiple sources and computers. Scanned hardcopy documents may additionally contain handwritten comments and annotations that may be relevant to the particular litigation case. For example, a person's initials or a handwritten margin note may serve as an indication that he or she has read the document and thus was aware of its content at the time. In a typical litigation case, a limited period of time is allocated to the legal discovery team to sift through the millions of documents and find the key documents containing relevant information to the case at hand.

Part of the problem in such a review is that the documents are not typically organized in a manner that facilitates the relevant information search. Duplicate and near-duplicate documents of similar content may be interspaced with many other unrelated documents. Since the sought after information may contain handwritten text and/or annotations for which OCR (Optical Character Recognition) is unreliable, the large quantity of documents must be manually inspected by a legal discovery team, which is a costly, time consuming and prone to error process.

BRIEF DESCRIPTION

A system and method of detecting duplicate document content in a large document collection and automatically highlighting duplicate or different document content among the detected document content using two-dimensional visual fingerprints.

DETAILED DESCRIPTION

By taking advantage of the concepts of this application identical duplicate documents and documents having nearly identical and/or similar content can be automatically identified in a large document collection regardless of their format (whether electronic or hardcopy) and location within the collection. This is for example useful in case of e-mail data, where a document may have been e-mailed back and forth between many users and in consequence many local copies and versions of the document may exist. Likewise, for near-duplicate documents, the method of this application can be used to highlight the difference from one reference copy, thereby enabling a reviewer to quickly and effectively focus attention on the difference without having to re-examine the entire document content each time. This can accelerate the effectiveness of the search and significantly reduce the associated cost.

In addition, the system and method of this application can be used to look for similar partial document content within the collection. All documents containing a particular visual pattern, such as a particular text pattern, a table, a line-art drawing, copy of an identical signature, a company logo, etc., could all be instantly retrieved from the collection and examined side-by-side, regardless of how the collection is organized.

Figure 1:
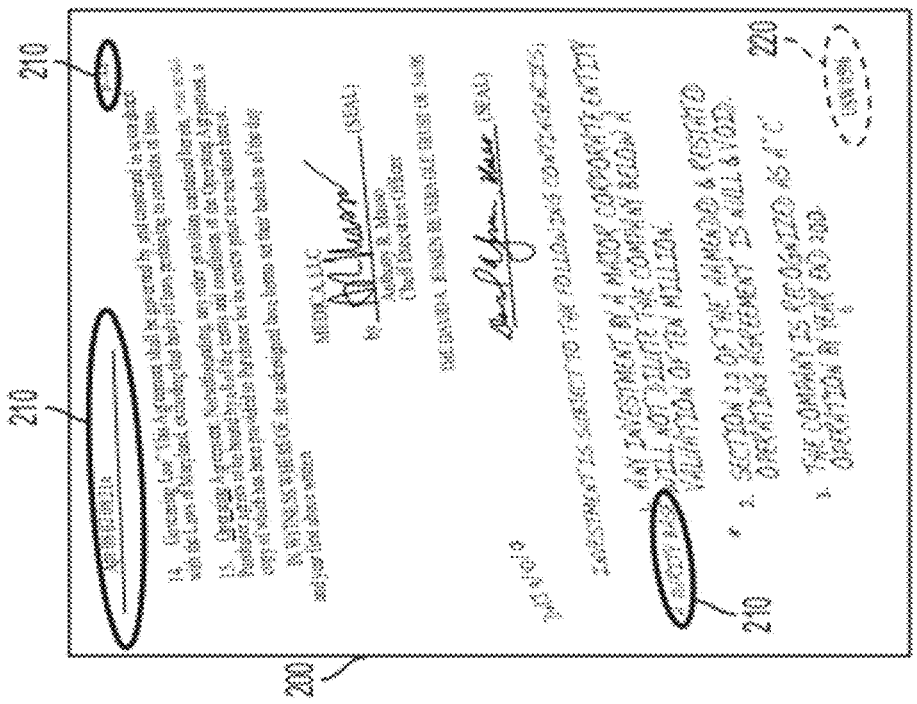
FIGS. 1 and 2 illustrate examples of duplicate content detection and difference highlighting using 2D visual fingerprinting.
Figure 2:
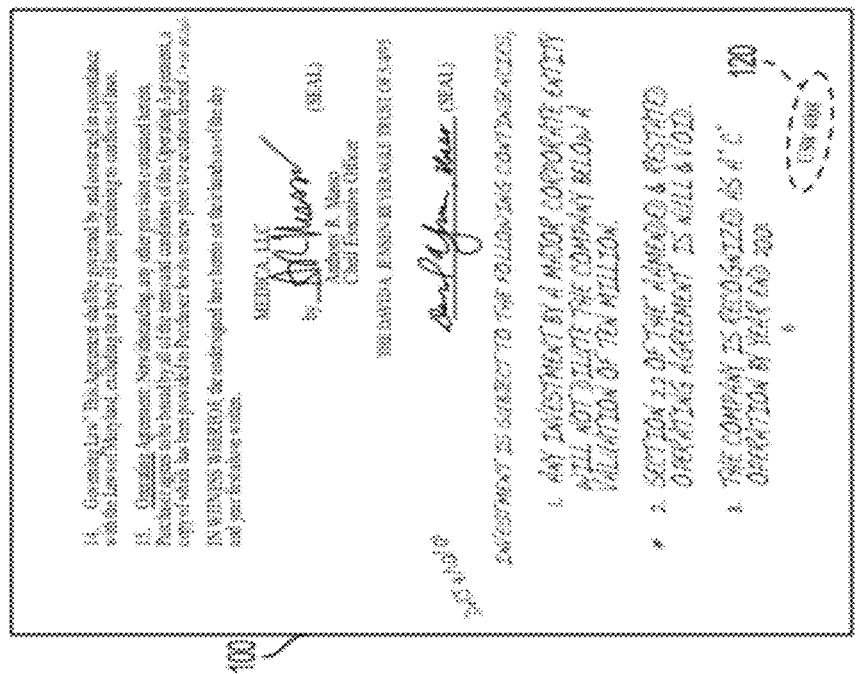

FIG. 1 illustrates an example of an original document page 100 with certain hand annotations and FIG. 2 illustrates a modified document page 200, of the original page 100 that has a further hand annotation and which was further transmitted through a facsimile machine. A fax title and fax page number have been automatically added at the top of the modified page 200 by the fax machine, and the original content has been scaled down in size to make room for the fax title. In addition, during the process of faxing the document, the paper of page 200 became significantly skewed while passing through the fax machine rollers as can be seen by comparing the upper parts of FIGS. 1 and 2. Since the majority of the page contains handwritten text and annotations, at a different scale and skew angle, it is generally difficult to identify arbitrary duplicate and non-duplicate document content which cannot be readily recognized by OCR with high accuracy.

FIGS. 1 and 2 illustrate the advantage of using two-dimensional (2D) visual fingerprinting and highlighting method in accordance with this application. The visual fingerprints of each of the document pages 100 and 200 are extracted, and the fingerprints are compared in order to identify duplicate document content. By using affine or perspective-invariant fingerprints, corresponding document areas of identical content will yield matching visual fingerprints regardless of the page orientation and scale. In this particular example, differences between the original and modified page are highlighted. As can be seen in FIGS. 1 and 2, the differences are automatically highlighted with oval lines 210 (usually marked in color to draw human attention). The ovals 120 and 220 (shown in dotted lines and also usually marked in color) represent expected differences due to unique document ID stamps that are not part of the original document content but rather added at scan time for identification purpose.

In one embodiment the system identifies that such expected changes are found by determining the location of the material. For example, it may be known that legal documents are provided with an identifying stamp at a certain location on a page. Therefore when the system detects changes in this location on a page the detected change is identified as expected and such change is handled accordingly. It is noticed that the time and date stamps which are added due to page 200 having been faxed are circled in a solid line. In this system the locations of this fax information have not been entered into the system as expected change locations, therefore the solid lines are used. Of course other ways of identifying expected changes can be built into the system. For example the system could be configured to recognize a symbol or letter/number combination to identify an expected change (e.g., the system used to generate page 200 in one embodiment would under this embodiment be configured to recognize the letter string "USW" and a certain amount of alpha-numeric characters following as an expected change).

It should be noted that modified page document 200 and other pages of similar document content can be automatically identified and retrieved by the method and system of this application. The reviewer need not make any effort to identify related pages or specify detailed criteria. The method and system of this application can also quickly retrieve all candidate matching pages by simply looking up fingerprints in response to a particular query page. The automatic highlighting feature of this application allows the reviewer to quickly eliminate duplicate document page copies and easily pinpoint the difference relative to the query page. Since the fingerprint pattern is identical except in the highlighted areas, there is no need to re-examine the modified document page content in areas of matching corresponding fingerprints. The reviewer can therefore quickly focus on the key areas of difference (highlighted by the ovals 120, 210, 220), and easily and effectively determine what changes, if any, may be relevant to the case at hand. Thus the system and method of this application streamlines the process of large document review and save hours of costly, tedious and prone-to-error manual labor.

Figure 3:
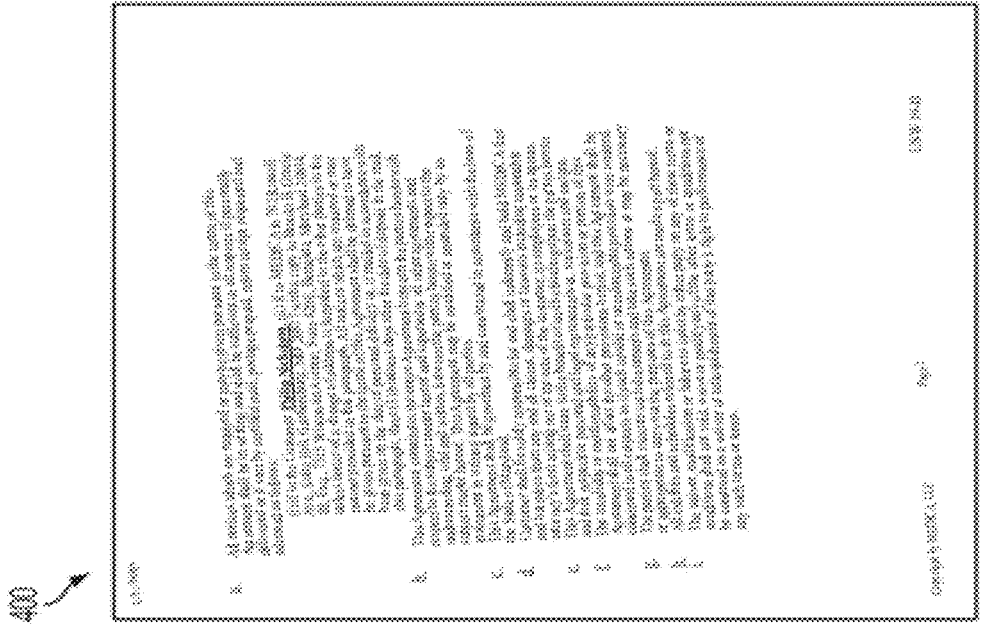
FIG. 3 shows a scanned original page.
Figure 4:
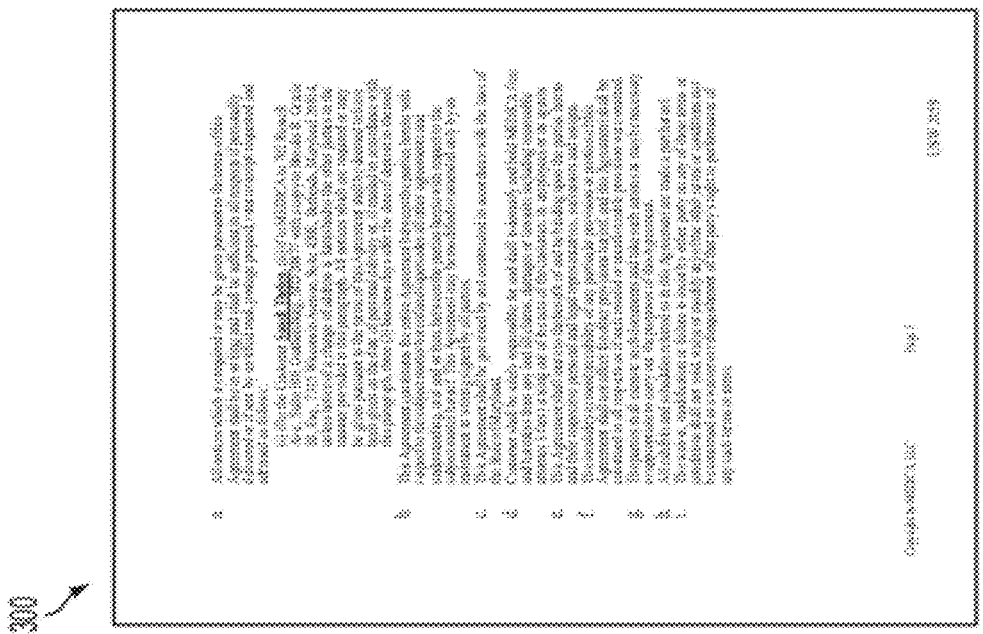
FIG. 4 shows a modified document page of FIG. 3.
Figure 9:
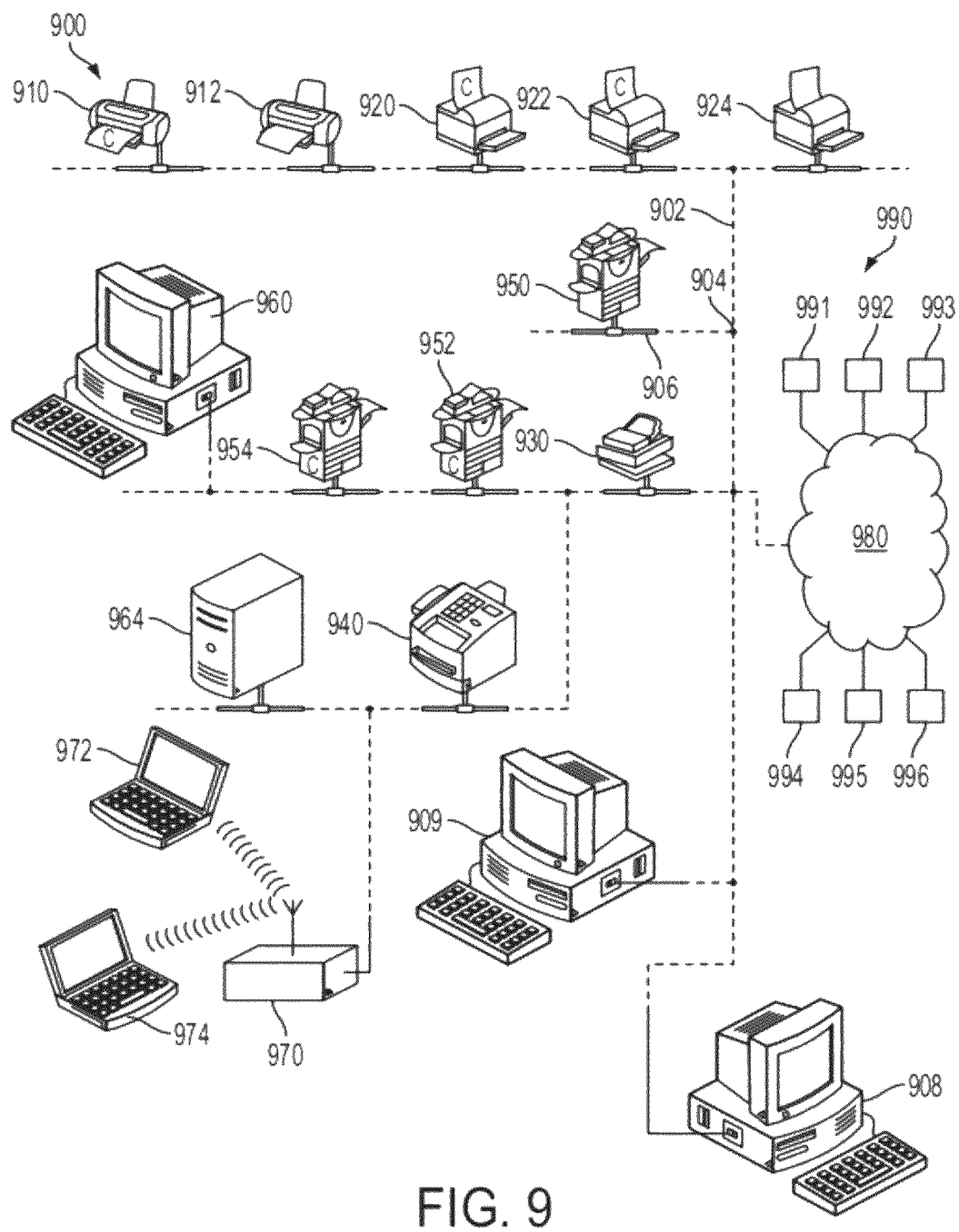
FIG. 9 sets out an environment in which the concepts of the present application may be implemented.

Turning now to FIG. 3 illustrated is a scanned original page 300 from a large document collection (other pages in the collection not shown). FIG. 4 shows a query image of a scanned modified page 400 presented at the input of a system incorporating the concepts of the present application (e.g., as illustrated in FIG. 9). The query page image 400 contains intentionally added (e.g., time stamp and document identifier) as well as content change modifications (e.g., name change and fax header) text annotations. Although these annotations are text generated in this example, the annotations in general are not limited to text and may also contain any other type of marks on page such as line art, charts, tables, etc., including handwritten, as shown for example in FIG. 2.

One operation of this application automatically finds any page in the collection that contains some duplicated content of the query page image 400. A second operation of the system is to automatically highlight the duplicated content, or the difference, between each such found page and the query page image in order to help a human observer visually compare and quickly see the changes.

In this application 2D visual fingerprinting technology is used to address the above. Initially, the pages in the document collection are first processed to extract their visual fingerprints and build a fingerprint index for fast and efficient fingerprint lookup. The collection need only be indexed once, and this can be done in advance, at an offline time, before the first query page image is presented.

Figure 5:
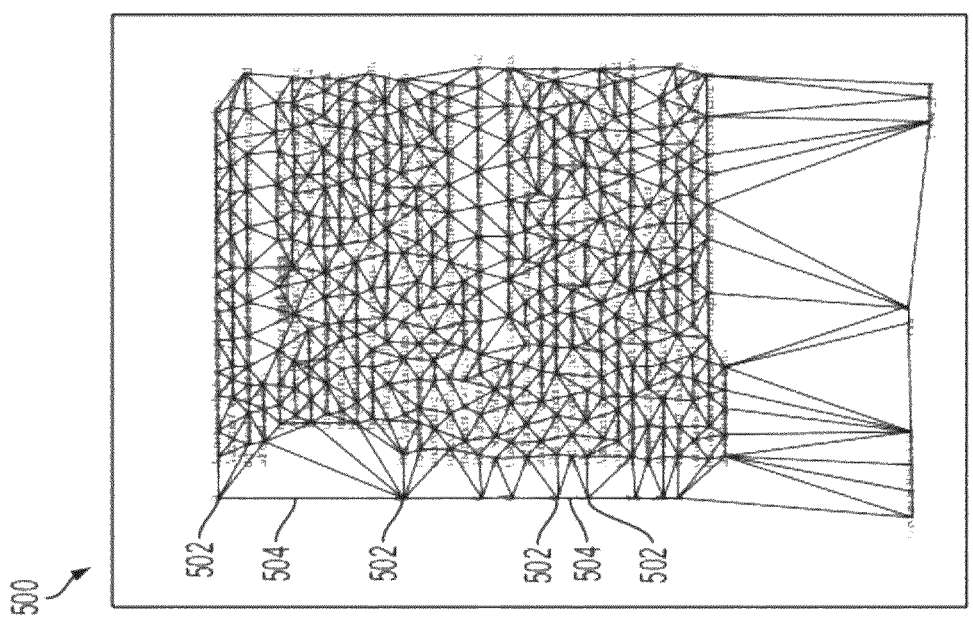
FIG. 5 illustrates fingerprint locations (node circles) and grid layout (lines) super-imposed on the scanned original page of FIG. 3.

FIG. 5 illustrates an image 500 with the fingerprint locations found for the scanned original page in FIG. 3 superimposed over the scanned original content of that page. The fingerprint locations are shown as node circles 502 (only a sampling are numbered). A grid mesh of line-segments 504 (only a sampling are numbered) connecting the fingerprint locations is shown to illustrate the fingerprint layout structure. Looking at FIG. 5 one can appreciate the relationship between fingerprint locations and the original document page content.

Figure 6:
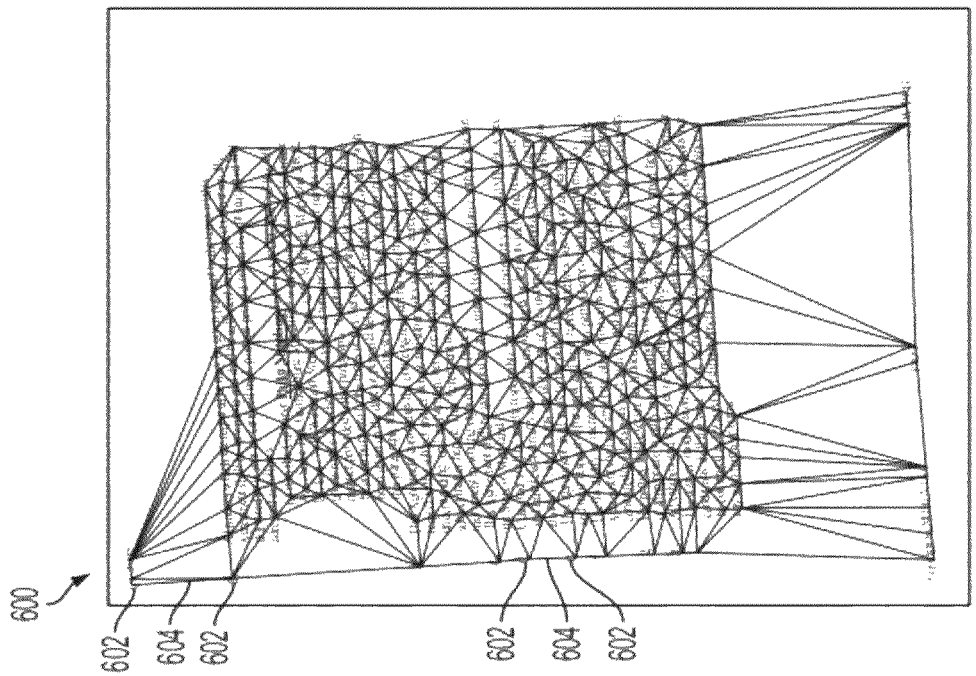
FIG. 6 illustrates fingerprint locations (node circles) and grid layout (lines) super-imposed on the rotated faxed modified scanned page of FIG. 4.

In query time, the query page image is processed in a similar manner to extract its visual fingerprints. FIG. 6 illustrates an image 600 with fingerprint locations found for the query image in FIG. 4 super-imposed over the content of the original image page of that figure. The fingerprint locations are shown as node circles 602 (only a sampling are numbered). A grid mesh of line-segments 604 (only a sampling are numbered) connecting the fingerprint locations is shown to illustrate the fingerprint layout structure. Looking at FIG. 6 one can appreciate the relationship between fingerprint locations and the query image content.

By comparing the grid mesh structure of the query image in FIG. 6 to that of the grid mesh structure of the scanned original in FIG. 5, the common parts of similar structure can be identified. The method of this application takes advantage of the common structure to identify the common and different aspects between the two documents.

The query page image fingerprints are looked up in a document collection fingerprint index to retrieve all pages in the collection that have a certain number of similar fingerprints. Since many parts of the original page content in FIG. 3 are common to the query page image in FIG. 4, these two pages are likely to have many identical fingerprints. Therefore, the original document page in FIG. 3 is likely to be among the pages returned by the index lookup.

A document collection may contain many pages of similar content to a given query image. When there are multiple matching pages, the matching pages are ranked and sorted by decreasing level of similarity based on the number of matching fingerprints. The resulting pages can then be interactively presented to a user in ranked similarity order to the query image. The user can inspect pages, review the automatically highlighted differences, and stop the search when the level of similarity dropped below an acceptable threshold.

A fingerprint comparison analysis is carried out on each returned page to determine the fingerprint correspondence with the query image fingerprints. The analysis identifies clusters of unique (non-corresponding) fingerprints and computes a 2D visual measure, some geometric element (e.g., an ellipse), for each cluster that is proportional to the cluster distribution and other factors such as the number of corresponding fingerprints occurring inside or in close proximity to a cluster, cluster fingerprint density, etc. It is understood that while ellipses are shown here as the identifier other elements may be additionally used to highlight the differences or similarities.

The resulting set of ellipses, for the returned document page and in turn for all returned pages, is added or superimposed on top of the visual image display, to automatically highlight the areas of difference relative to the query page image.

Figure 8:
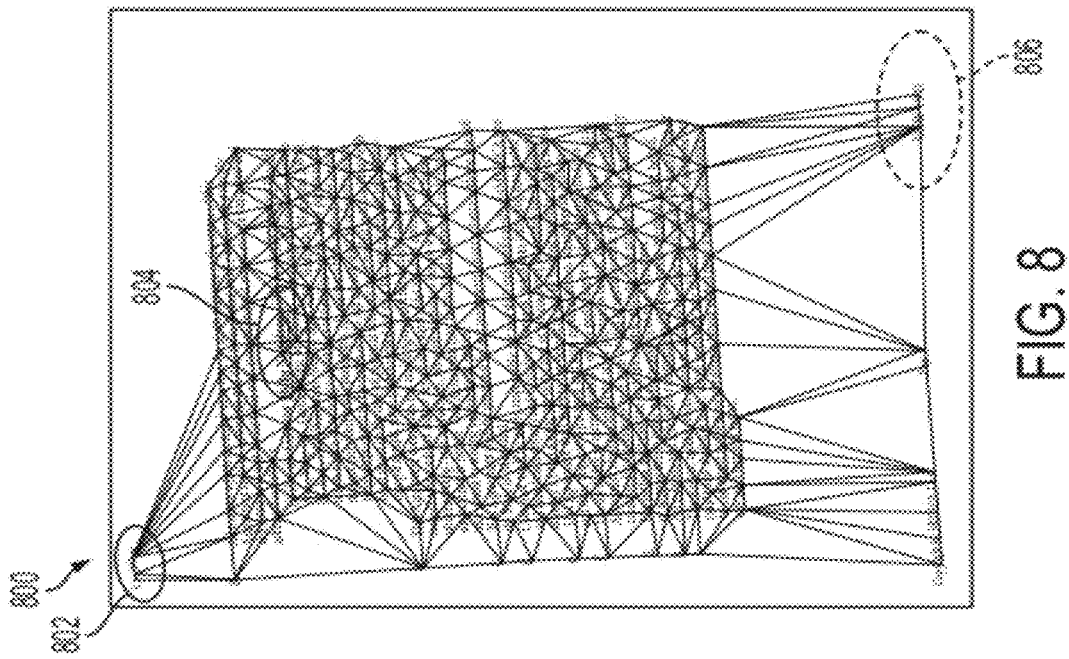
FIGS. 7 and 8 show the results of fingerprint comparison analysis and highlighting of the difference between the original and modified pages.
Figure 7:
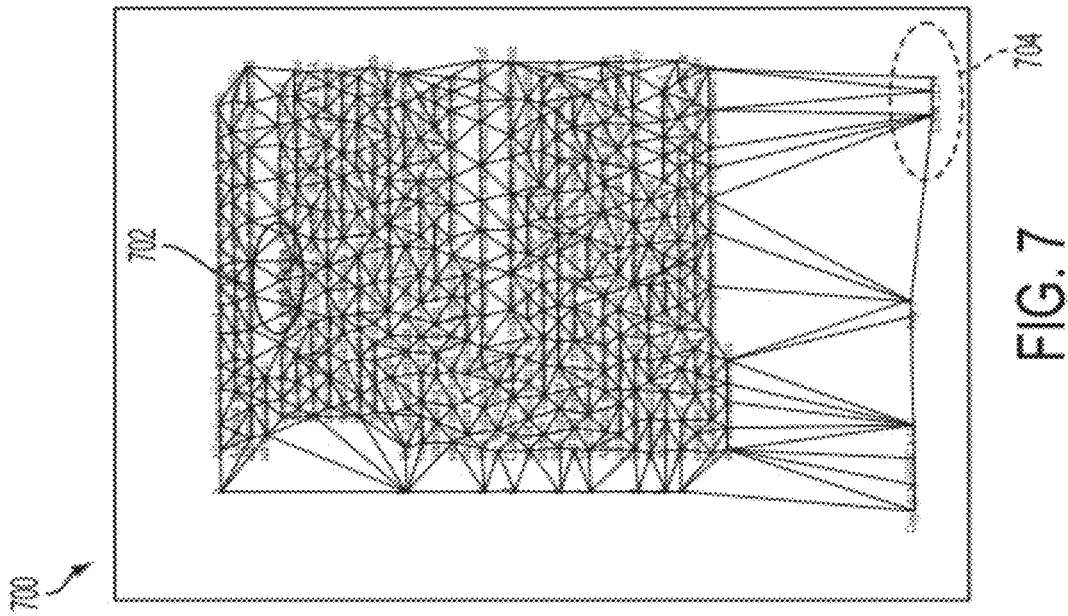

FIGS. 7 and 8 illustrate the results of the fingerprint comparison analysis between the query page image in FIG. 4 and the scanned original page in FIG. 3. FIG. 7 shows the document page in FIG. 3 augmented with two clusters of non-corresponding fingerprints surrounded by ellipses 702, 704. These clusters represent the areas in the scanned original page not common to the query image. All other fingerprints of the original document page in FIG. 3 are identically found in the query image of FIG. 4, i.e., indicating duplicated document content. Note, however, that the content of the ellipse 704 surrounding the cluster in the bottom right-hand corner is a document identification label entitled "USW 2159" which is understood not part of the original document. A unique label is stamped on each document as part of the scanning process. The dotted-line in this case indicates the unique identification stamp that is not expected to match other pages.

Similarly, FIG. 8 shows the result 800 of the fingerprint comparison analysis for the query image in FIG. 4 with the difference from the document page in FIG. 3 highlighted by ellipses 802, 804, 806. As can clearly be seen, the method of this application automatically highlights three distinct areas in FIG. 8. These three areas represent the fingerprint areas in the query image not in common with the scanned original page in FIG. 3. All other fingerprints of the query image are identically found as in the original document page, i.e., indicating duplicated document content. The two solid ellipses 802, 804 in the top of FIG. 8 highlight the changes: timestamp and text modification annotations with respect to the original document content. The dotted ellipse 806 on the bottom right of FIG. 8 indicates a unique identification stamp that is added as part of the scanning process and is not expected to match other pages. While the circles and grid lines are shown in FIGS. 7 and 8, they may not be shown in practice, and therefore the output comparison would look more like that shown in FIGS. 1 and 2.

It is to be noted that FIG. 4 illustrates an example of scanned/faxed copy of original page shown in FIG. 3, where the scanned/faxed image of FIG. 4 is a rotated modified faxed page. The example in FIG. 4 illustrates the robustness of the fingerprinting method of this application to affine and perspective distortions such as translation, rotation, scale, skew, shear, resolution conversion, etc.

As can be appreciated from FIGS. 1-8, despite the obvious translation, rotation and image quality degradation in faxing, the proposed method of this application can successfully detect and correctly highlight all existing differences between the query image and a corresponding original page in the document collection.

The system and method as described herein may work within a variety of environments including but not limited to a network as illustrated in FIG. 9. The network 900 is comprised of a series of connections such as wires 902, many of which may branch or join with a third wire 906 at a wire junctions 904, may connect a standalone peripheral device or pass through a peripheral to connect to other devices, such as computers 908, 909, wherein a computer may be considered a peripheral device. The network may incorporate a color printer 910 or other than color printer 912 as well as at least a color laser printer 920, 922 or one other than color laser printer 924. The network may also incorporate a scanner 930, or a fax machine 940, a photocopier 950, a color photocopier 952, or a combination color printer/scanner/fax machine 954. The network may also contain a personal computer and/or standalone computer terminal 960, or a standalone hard drive data storage medium 964. The network may also contain a wireless network transmitter receiver 970 and interface with at least one laptop computer 972, or a plurality of laptop computers 974. The network may also interconnect with any form of network 980 including but not limited to the Internet, an Intranet or other communication network. Through use of an interface with another form of network, the present system and method may interface with a plurality of peripheral data capturing devices 990 including, but not limited to a digital still camera 991, a digital video camera 992, a cellular telephone 993, a scanner 994, a personal data assistant 995, or a document indexing system 996. It is to be understood the present concepts may be implemented in networks having various combinations of the above components, going from a network having a single device to one which includes thousands or more connected devices. Further, various ones of the above components may have memory storage areas arranged in any of a number of known configurations which may be useful in implementing the concepts to be described. The storage areas may be RAM, ROM, Flash Memory, web services, cloud storage facilities or other memory types which can hold software incorporating the concepts of the present application. Other memory storage areas may be configured to hold various digital images in any of a number of database formats. Still further, various ones of the components of FIG. 9, such as but not limited to the computers, include processors to process instructions from software loaded on or otherwise accessible by the components. It is to be understood various ones of the components having the processors may have more than one processor whereby processing of the instructions can be divided among the multiple processors. Alternatively, a single processor can operate to divide the instructions, whereby processing can occur in a multi-threaded environment. The computers may be other computing devices than those mentioned above and will include electronic/digital processors as well as or in the alternative graphical electronic/digital processors (GPUs).

Figure 10:
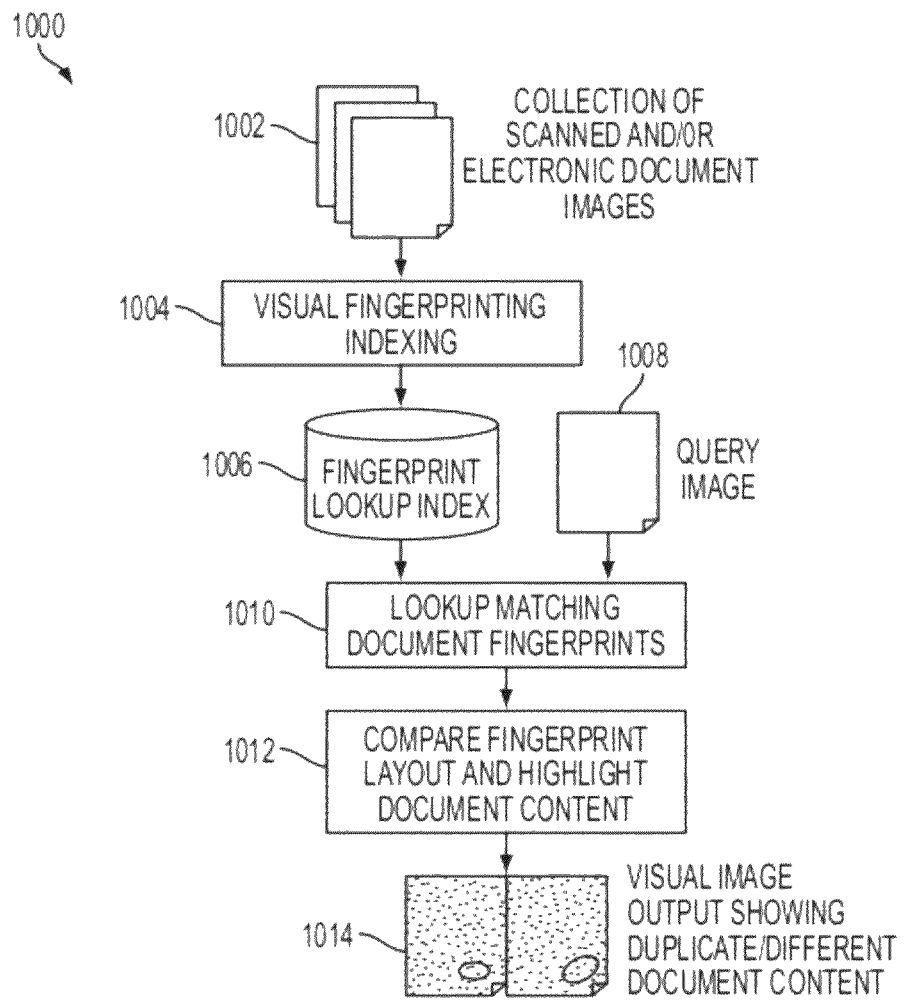
FIG. 10 illustrates a method of detecting duplicate document content in a large document collection and automatically highlighting duplicate/different document content using two-dimensional (2D) visual fingerprints.

Turning now to FIG. 10 illustrated is a method 1000 of detecting duplicate document content in a large document collection and automatically highlighting duplicate/different document content using 2D visual fingerprints in accordance with the concepts described herein. To facilitate fast document lookup based on visual fingerprints, a document collection 1002 is first indexed and organized in a particular manner (such as by use of a Fan Tree) for fast and efficient fingerprint lookup 1004. The document collection may include electronic and/or scanned hardcopy document versions in arbitrary order. A document collection in this context is an abstract logical document collection that may be physically located at one location or physically distributed in a set of sub-collections across many folders, drives, systems, networks, remote servers, web services and/or cloud storage facilities, etc.

A visual fingerprinting and indexing process 1004 is applied in turn to the pages of the documents in the collection. Depending on document type, scanned documents are processed to clean and enhance the image for fingerprinting, and electronic documents are rendered into page images for visual fingerprinting. The fingerprints of each image and their locations are added to a fingerprint lookup index 1006, which is found in a memory. The fingerprint lookup index is built to facilitate fast and efficient fingerprint lookup.

The fingerprint lookup index 1006 need only be fully constructed once for a given document collection. Once a collection has been indexed in this manner, the fingerprint index can be saved and re-used. The fingerprint index can be incrementally updated when documents are added or removed from the collection by adding the fingerprints of new documents to the index and removing existing fingerprints of deleted documents. The incremental update may be applied as a background process in a separate thread.

The method of detecting duplicate document content is presented with a query page image 1008. The query page image is fingerprinted and the fingerprints are looked up 1010 in the fingerprint lookup index to return a list of collection documents and the number of matching fingerprints corresponding to query page image fingerprints. The list of returned collection documents is ordered by the number of corresponding fingerprints (e.g., most to least). Only the top matching pages above a required minimum of corresponding fingerprints may be retained.

For each matching page in the collection, the corresponding fingerprints are retrieved from memory and compared with the query fingerprints 1012. This fingerprint comparison analysis is carried out to determine the fingerprint correspondence between the query page image and the matching document. The analysis takes into account the fingerprint locations and their corresponding layout. Sets of corresponding identical fingerprints represent regions of matching document content, while clusters of unique (non-corresponding) fingerprints in either image represent differences in document content. Depending on the application to which the process is being employed, either the duplicate or non-duplicate document content may be automatically highlighted. For applications of duplicate and near duplicate content detection, it is often desirable to highlight the difference in content instead of the duplicate content (which in any case is identical between the two images). The purpose of the highlighting is to draw attention to the difference and make it easy for a user to catch the changes and see where they occur on each page image. A combination of simple visual cues (e.g., ovals, etc.) and color cues are used to highlight the differences without cluttering or obscuring the content.

One convenient and effective method of automatically highlighting the difference is by calculating the mean and standard deviation for the 2D locations of each cluster of unique (non-corresponding) fingerprints of the query and matching image collection document. An ellipse is computed for each cluster of non-corresponding fingerprints. The ellipse location is centered at the cluster mean, and the size of the ellipse is proportional to the estimated second moments of fingerprint location distribution within cluster. In addition, the ellipse size may be further controlled in proportion to the number and location of any corresponding fingerprints occurring inside or in close proximity to the cluster, and by cluster complexity, shape, and fingerprint density. The resulting ellipse is drawn or super-imposed on top of the visual image display in highlight color, or saved in a separate image layer or metadata. By looking at the corresponding images side-by-side, with the highlighting enabled, a user can quickly and intuitively observe the automatically highlighted difference in 1014 and determine the relevancy (to a litigation discovery case, for example).

Figure 11:
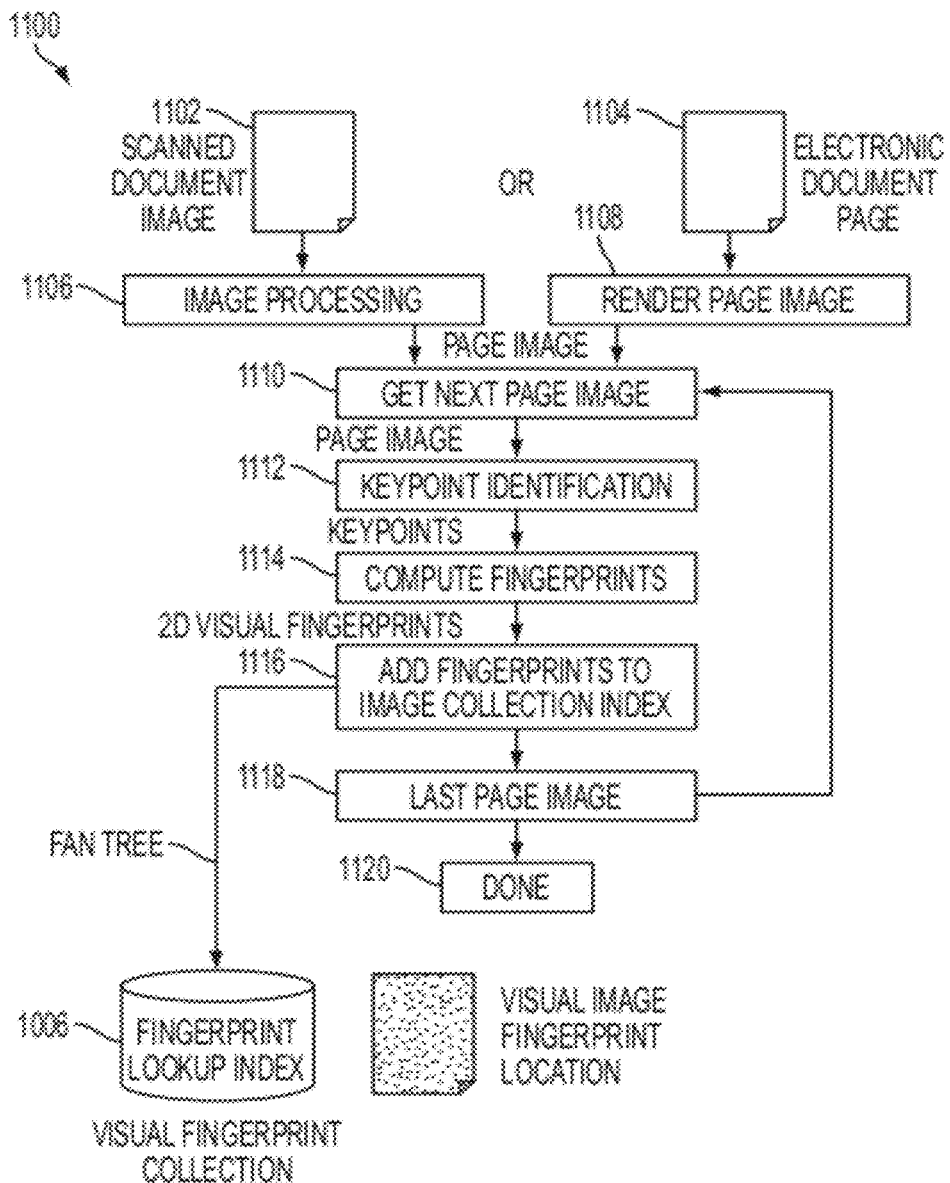
FIG. 11 illustrates a method of indexing, i.e., processing page images, computing visual fingerprints, and adding fingerprints and their locations to a specified image collection database.

FIG. 11 illustrates an indexing method 1100 which provides additional details to the indexing of a collection of documents to create fingerprint lookup index 1006 (see FIG. 10). The indexing method 1100 is comprised of processing a sequence of page images, computing visual fingerprints and adding the fingerprints and their locations to a specified image fingerprint lookup index.

Process 1100 is shown in this embodiment to be used in connection with a document collection that contains scanned hardcopy documents 1102 and/or electronically generated documents 1104. It is understood, different document types require different pre-processing. Scanned hardcopy documents are comprised of scanned page images that may contain less than ideal conditions such as fax or scanner noise, page skew and dark image background, for example. An image processing stage 1106 may be included to remedy and further enhance the image prior to fingerprinting. Electronic documents 1104, on the other hand, such as Microsoft Word, Excel, PowerPoint, or Adobe PDF, for example, are rendered 1108, by drawing the content to create a sequence of page images for fingerprinting.

The indexing method 1100 in turn processes the page images 1110 from the documents in the collection. The order of indexing documents is not significant. For each document in the collection, the system automatically determines the document type, whether a scanned hardcopy or electronic original, and automatically applies the appropriate processing 1106 or 1108, respectively.

Keypoint identification 1112 is responsible for identifying stable and repeatable keypoints in each page image. Previously developed methods of finding keypoints in a document or photo page image have been developed. In one embodiment, of a method of keypoint identification for document images based on word-blob centroids is described in U.S. Ser. No. 12/147,624: METHOD AND SYSTEM FOR FINDING A DOCUMENT IMAGE IN A DOCUMENT COLLECTION USING LOCALIZED TWO-DIMENSIONAL VISUAL FINGERPRINTS, Kletter, Saund, Janssen, Atkinson.

Another embodiment for identifying stable and repeatable keypoints in a photo image is detailed in U.S. Ser. No. 12/147,867: SYSTEM AND METHOD FOR FINDING STABLE KEYPOINTS IN A PICTURE IMAGE USING LOCALIZED SCALE SPACE PROPERTIES by Kletter.

Depending on the application, weaker keypoints found below a certain measure of strength threshold may be discarded.

2D visual fingerprints are computed 1114 from the resulting keypoints. Previously developed methods of computing visual fingerprints from image keypoints, based on geometry or image appearance have been developed. In one embodiment, a geometry-based method of computing 2D visual fingerprints for document images is described in 20080166-US-NP: METHOD AND SYSTEM FOR FINDING A DOCUMENT IMAGE IN A DOCUMENT COLLECTION USING LOCALIZED TWO-DIMENSIONAL VISUAL FINGERPRINTS, Kletter, Saund, Janssen, Atkinson The resulting fingerprints and their locations are added 1116 to the image collection fingerprint index 1006. The image fingerprints are added to the index and hashed in a special manner in order to facilitate fast and efficient fingerprint lookup (e.g., such as by use of a Fan Tree). In one embodiment, one effective method of organizing the fingerprint in memory for fast lookup is detailed in U.S. Ser. No. 12/147,624: METHOD AND SYSTEM FOR FINDING A DOCUMENT IMAGE IN A DOCUMENT COLLECTION USING LOCALIZED TWO-DIMENSIONAL VISUAL FINGERPRINTS, Kletter, Saund, Janssen, Atkinson Another embodiment for finding a picture image in an image collection is described in U.S. Ser. No. 12/163,186: SYSTEM AND METHOD FOR FINDING A PICTURE IMAGE IN AN IMAGE COLLECTION USING LOCALIZED TWO-DIMENSIONAL VISUAL FINGERPRINTS by Kletter.

Process 1100 repeats for each page of each document in the collection until the last page image 1118 is encountered. At this point, the resulting fingerprint lookup index 1006 (see also FIG. 10) is saved and may be re-used. The fingerprint lookup index 1006 can be incrementally updated when additional pages are added or removed from the collection as outlined in [0046] above.

Figure 12:
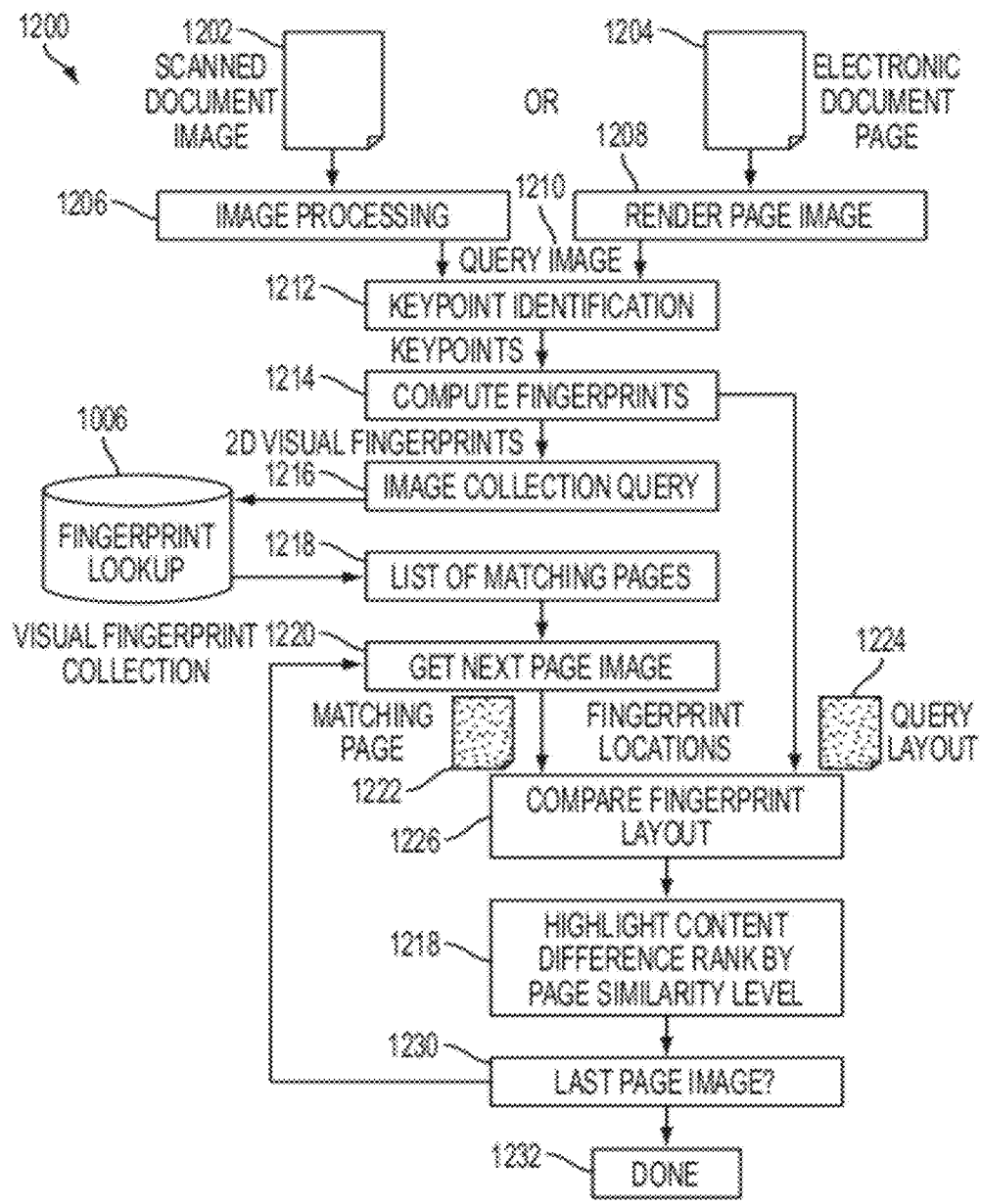
FIG. 12 illustrates a method of detecting duplicate document content using 2D visual fingerprints, automatically highlighting content difference, and ranking pages by page similarity level.

FIG. 12 illustrates in more detail a query process/method 1200 of detecting duplicate document content using 2D visual fingerprints using a query image; automatically highlighting content difference; and ranking pages by page similarity level.

The query process 1200 begins with a query page presented at the input. As previously mentioned the systems described herein will work with a variety of document types, including but not limited to scanned documents 1202 and electronic documents 1204. The query page itself may be a page of scanned hardcopy document 1202 or a page image of electronic document 1204. The system automatically determines (e.g., by reading an accompanying information file) the document type, whether scanned hardcopy or electronic original, and automatically applies the appropriate processing 1206, 1208, respectively, as outlined above. The system may apply image processing to clean and enhance a degraded 1202 scanned hardcopy query page to produce an improved query image 1210 prior to fingerprinting. Alternatively, the system may render an electronic query page of a Microsoft Word, PowerPoint or PDF document page into a query image 1210. Note that at this time the processing is being applied to the query page image image rather than to document collection page images.

The same method of identifying keypoints 1212 and computing 2D visual fingerprints 1214 used during indexing is applied to the query page image. The resulting fingerprints are looked up as a query 1216 in the collection fingerprint lookup index 1006 to return a list of matching pages 1218 from the collection of documents with matching corresponding fingerprints to the query page image fingerprints. The list is ordered by the number of matching corresponding fingerprints, the match rank.

Then the process will identify one of the pages from the list (Get Next Page Image) 1220 as a matching page 1222. The corresponding fingerprints of that matching page 1222 are retrieved from memory index 1006. Then the fingerprints of that matching page 1222 and fingerprint layout 1224 of the query page image are subject to a fingerprint comparison analysis 1226. The fingerprint comparison analysis is carried out to determine the fingerprint correspondence between the query page image and the present matching document page. The analysis compares fingerprint locations and corresponding layout and identifies clusters of unique (non-corresponding) fingerprints in the query and matching document image. The analysis calculates the level of matching document page similarity with the query page image based on the matching fingerprint locations.

Thereafter, content differences are highlighted 1228. In one embodiment, for example, an ellipse is computed for each cluster where the size of the ellipse is proportional to the estimated second moments of fingerprint locations within cluster. The size of the ellipse may further be adjusted in proportion to the number and location of corresponding fingerprints occurring inside or in close proximity to the cluster, and by cluster complexity, shape, and fingerprint density. The ellipse is used to provide a two-dimensional visual cue for a cluster of unique (non-corresponding) fingerprints.

The resulting set of ellipses for the returned document page and in turn for all returned pages is added or super-imposed on top of the visual image display in highlight color, or saved in a separate image layer or annotated metadata. By looking at the corresponding images side-by-side, with highlighting enabled, a user can quickly and intuitively observe the difference and determine the relevancy (to a litigation discovery case, for example).

Each returned page that meets or exceeds a specified level of page similarity with the query image, as computed by the fingerprint comparison analysis, is added to a list of corresponding documents.

The above process then checks if the present page image is the last page of the list of matching pages 1230. If not the process obtains a next page image from the list 1220 and repeats for each of the returned pages in the collection until the last matching page image is encountered and the process is completed 1232. At this point, the list of matching corresponding documents is ranked by page similarity level in order to return pages with the most duplicate content first.

Finally, a user may page through the list of corresponding documents, view in turn the query image side-by-side with each corresponding page image by rank order, with the highlighting enabled, in order to inspect and compare document content for relevancy (to a litigation discovery case, for example).

An aspect of a system outlined herein allows for having visually similar pages automatically presented in a sequence to the user in similarity rank order. Because of the ranking, visually identical duplicates are shown first (if any), followed by near duplicates in progressive order of decreasing page similarity level. Thus in a typical litigation discovery case, for example, the paralegal team can quickly scan through and discard the many identical copies (from scanned or electronic versions) and concentrate on the relevancy of subsequent changes and revisions. Of course the process can be designed to present the documents in an order other than that described above.

The system and method of this application enables a single user to quickly and effectively inspect all documents containing partially duplicated content regardless of how the collection is organized. This approach is superior to the practice of arbitrarily dividing the collection among the legal discovery team members and potentially having multiple resources inspect numerous identical duplicate copies.

The above discussion related to identifying keypoints, generating fingerprints, and building a Fan Tree are expanded upon in connection with what is shown in FIGS. 13-17, and the corresponding discussion are provided.

a.1 Detection of Document Keypoints

A goal of the keypoint identification (e.g., 1112 of FIGS. 11 and 1212 of FIG. 12) is to repeatedly and reliably find as many of the keypoints even in a degraded version of an image that is subject to at least one of, but not limited to noise, scene lighting variations, and affine transformations such as skew, warp, rotation, translation, scale, change of resolution, and the like.

Figure 13:
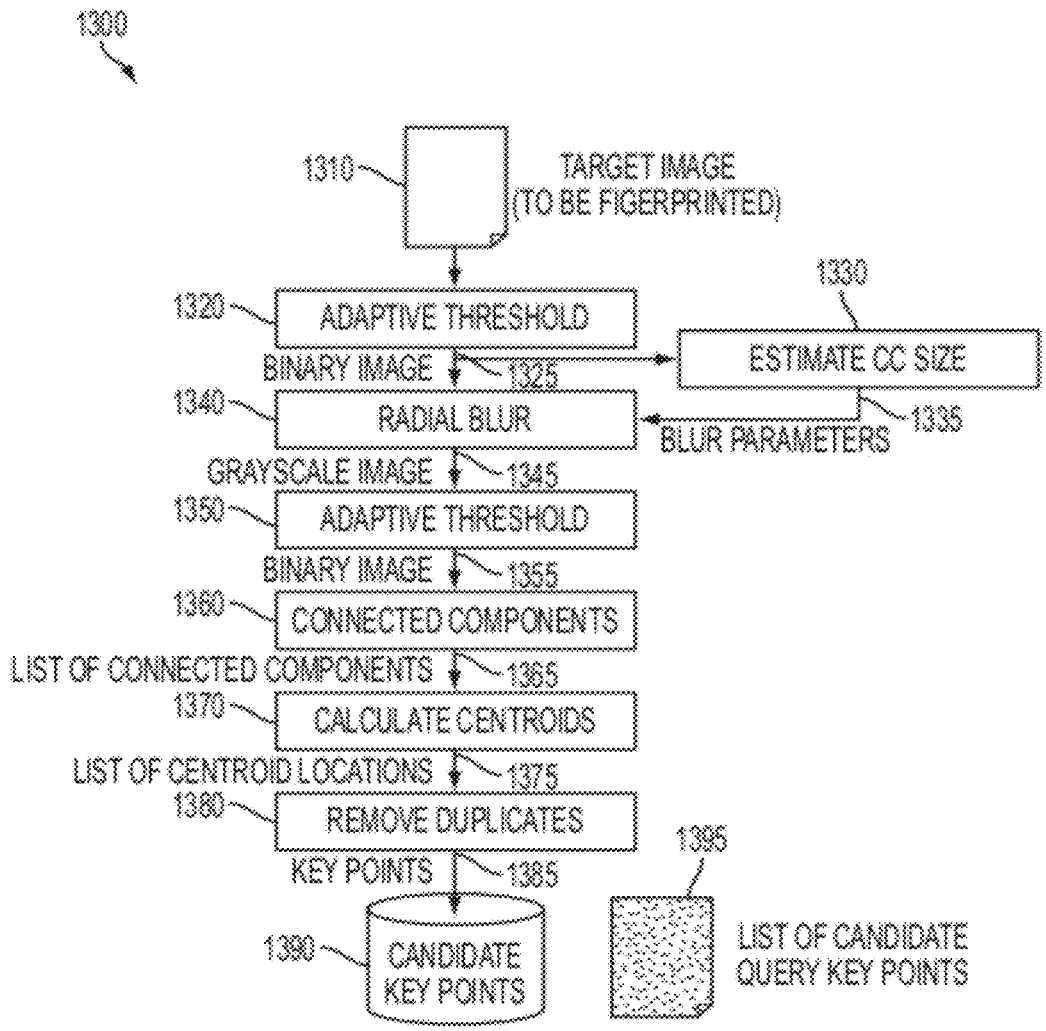
FIG. 13 is a method of identifying Candidate Keypoints in target documents.

One particular process of detecting document keypoint locations 1300 of a target image 1310 to be fingerprinted is shown in FIG. 13. Image processing of adaptive thresholding, blurring, and connected component collection are well known in the literature. It is desirable to perform the keypoint identification process in a perceptual image space in accordance with the properties of the human vision system.

A binary output image 1325 of a first Adaptive Threshold module 1320 is sent to an Estimate CC Size module 1330. The term CC here stands for Connected Component, which is a maximally connected sub-group of binary pixels having the same polarity. Two pixels are in the same connected component if and only if there exists a path of the same polarity pixels between them. The purpose of the Estimate CC Size module 1330 is to dynamically estimate, for the target image 1310 on an image by image basis, the blur parameters 1335 or blur filter size to be applied in the subsequent Radial Blur module 1340. The objective of the blurring process is to provide robust, reliable, and repeatable keypoint identification. The blurring also helps to remove noise such salt and pepper noise and eliminate small isolated features on the page. The shape of the blurring filter, for example but not limited to an approximated Gaussian shape, should be smooth enough to prevent from introducing undesirable artifacts.

The output of the Radial Blurring module 1340 is a grayscale image 1345. The Adaptive Threshold module 1350 converts the grayscale Radial Blur 1340 image output 1345 to binary black and white output 1355 by adaptive thresholding 1350.

The binary output of the second Adaptive Threshold module 1350 is a binary image 1355 and is forwarded to the Connected Component module 1360. Connected component methods are well known in the art, and may be considered a set of maximally connected components of a graph.

The Calculate Centroid module 1370 determines the visual center of each connected component at the output of the Connected Component module 1360. For each connected component, the horizontal centroid location is calculated by summing together the horizontal coordinates of each member pixel of the connected component and dividing the outcome by the total number of member pixels. The vertical centroid location is likewise calculated by summing together the vertical coordinates of each member pixel and dividing by the number of member pixels. The summation can be effectively done on-the-fly during the connected component analysis. Note that only the pixel members of a given connected component contribute to its centroid location, ignoring any other non-member pixel "holes". The visual centroid of each connected component is calculated with subpixel precision, since in many languages the connected components tend to be situated in text lines.

In the last processing step of the keypoint identification phase, the list of connected component centroid locations 1375 from the Calculate Centroid module 1370 is validated by the Remove Duplicates module 1380, which produces a list of keypoints 1385. The purpose of the validation is to ensure that no two connected component shall have the same centroid locations within a given tolerance level. Duplicated connected components with nearly the same centroid locations are eliminated.

The list of remaining connected component centroids at the output of the Remove Duplicates module 1380 becomes the final candidate query keypoints list 1395. The overall number of candidate keypoints 1390 depends on the Input image content and the type of connected component processing. There can be several hundred keypoints for a typical machine printed page.

a.2. Construction of Fingerprints

This section describes the process of computing fingerprints from local groups of keypoints and packing the fingerprints for efficient storage in a Fingerprint Lookup Index or Database (e.g., 1006 of FIGS. 10, 11, 12). The fingerprints are packed to reduce the Fingerprint Lookup Index or Database size and storage requirements.

We seek to identify robust 2D visual fingerprints in the input image that will be stable across a wide range of noise, viewing conditions, and image distortions. In addition, fingerprint size can be minimized in order to enable the system to effectively scale up to handle very large document collection sizes such as a collection containing millions or billions of documents. Since the fingerprint database consists of all the valid fingerprints in the collection. At the same time, the fingerprints are expected to identify the individual content they represent with high accuracy and confidence.

Fingerprints are constructed as sequences of quantized, transformation-invariant 2D ratios, called persistent ratios, which are derived from the relative 2D positions of a given keypoint and its (N−1) nearest-neighbor keypoints. Thus each fingerprint is localized to a small image neighborhood around the keypoint of interest. A fingerprint sequence is dependent only on the relative 2D geometry between the keypoint of interest and its (N−1) closest keypoint neighbors. The number of neighbors N is a design parameter that influences the fingerprint strength.

An aspect of the present application lies in making the fingerprints robust to certain image distortions such as, but not limited to skew, warp, rotation, translation, scale, change of resolution, and the like, that commonly occur during the process of scanning or taking a picture of the image with a digital or a cell phone camera.

As illustrated in FIG. 14, it is well known in the art that for any given polygon 1400 comprised of four non co-linear points {A, B, C, D} (i.e., 1410, 1420, 1430, 1440), on the object surface, comprising a triangle ABC 1450 and a second triangle ACD 1460, the ratio of triangle areas (ABC/ACD) 1470 remains constant under any affine transformation. Hence only P=4 points are needed to calculate one triangle area ratio, illustrated as the Triangle Ratio 1470. This affine transformation has been shown to provide an acceptable model for describing the camera to planar object geometry in many practical situations.

In another embodiment, for situations where a transformation order larger than affine is required to describe the image model, the transformation can be extended to handle perspective transformation using P=5 points (instead of 4) to calculate a single persistent ratio which is the product of two triangle ratios.

Figure 14A:
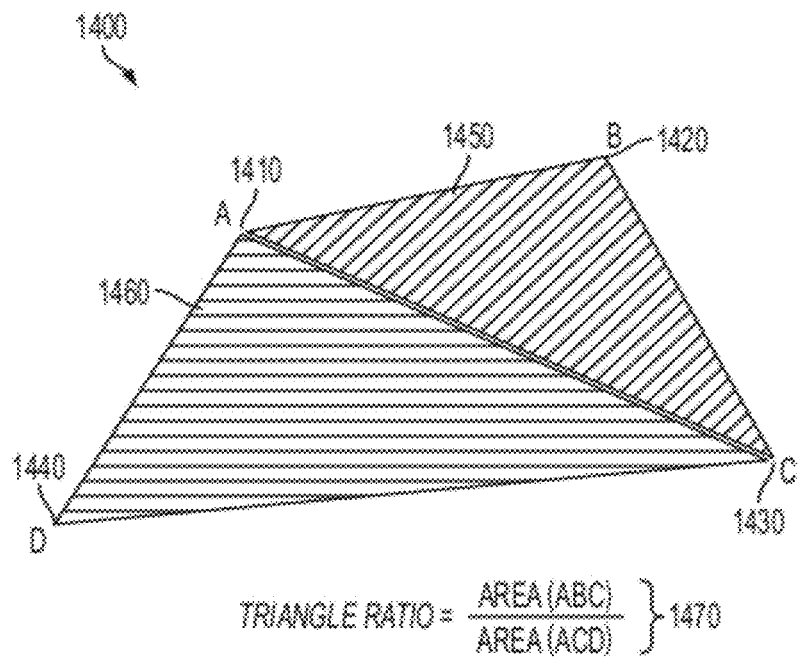
FIG. 14A illustrates the method of obtaining a Triangle Ratio for construction of Fingerprints.
Figure 14B:
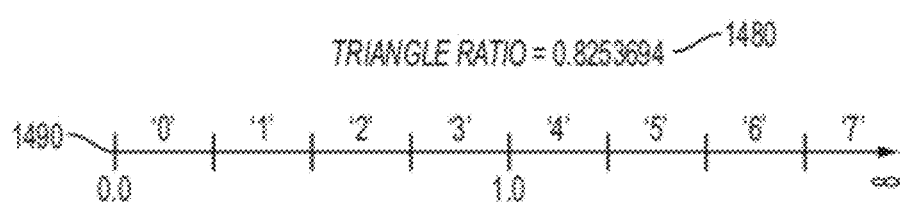
FIG. 14B is the Quantization of the Triangle Ratio of FIG. 14A

A single fingerprint is therefore comprised of a sequence of quantized persistent transformation ratios for a group of N nearest neighbor keypoints sorted in clockwise order. To keep the fingerprint size small, the transformation ratio is quantized to Q-levels 1480. In one embodiment, the value of Q can be conveniently chosen to be a binary power of two. In FIG. 14B, the quantization process is illustrated as the Quantization of the Triangle Ratio 1480 of FIG. 14A for the case of Q=8. The valid range (0, ∞) of a Triangle Ratio before quantization is divided into Q=8 intervals labeled '0' to '7' as shown in FIG. 14B (1490). The interval boundaries are determined empirically to provide approximately uniform distribution of quantization labels over a large set of representative documents. The incoming triangle ratio value 1480 is sequentially compared with increasing interval boundaries to determine the first higher or equal interval boundary, upon which the process is terminated and the corresponding label interval is assigned as the quantized result. For example, an incoming triangle ratio of 0.8253694, being less than 1.0 and higher than the previous interval boundary, is assigned a quantized value of '3'.

A potential issue in using the nearest neighbor method is that nearness is not necessarily preserved under perspective transformation. There can be no guarantee that the N nearest neighbors of a given keypoint will remain exactly the same N keypoints under arbitrary affine or perspective transformation. Still, the closest keypoints are more likely to remain in the list of N nearest neighbors than keypoints that are farther away.

To overcome the above issue, the present application proposes to allow one or more of the neighbor keypoints to be missing in order to further increase the robustness of a fingerprint to affine or perspective transformation. Under one embodiment, one keypoint is allowed to be excluded under the consideration of limited affine distortions in small localized neighborhoods. Thus each given keypoint gives rise to a number of fingerprints N, by leaving out one keypoint at a time. Each fingerprint is created by systematically walking a remaining number of keypoints, N−1, in radial order of orientation, and recording the sequence of quantized persistent ratios for all the possible combinations of P points (P=4 for affine, P=5 for perspective transformation).

Figure 15:
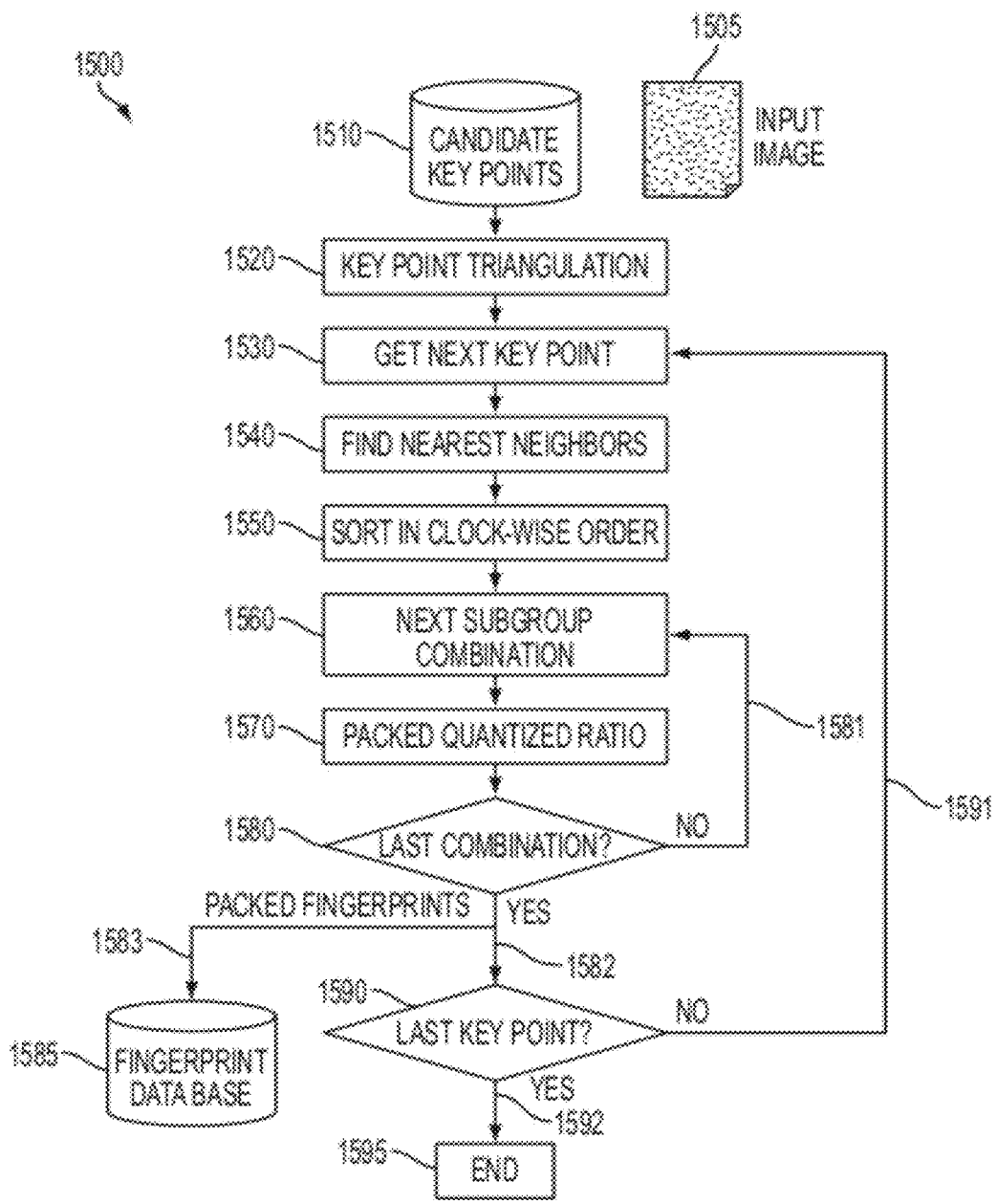
FIG. 15 is a method of Generating a Packed Fingerprint Database from Keypoints.

A Fingerprinting process 1500 is shown in detail in FIG. 15. The input to Fingerprinting process 1500 is the list of candidate keypoints 1510 for the input image 1505. The first Fingerprinting processing step in FIG. 15 is the Keypoint Triangulation module 1520. In this embodiment Delaunay or Keypoint Triangulation 1520 are used to identify the nearest keypoints to each given keypoint in a local neighborhood. By following the triangulation links, the nearest (N−1) neighbors to any given keypoint can be effectively determined.

Each candidate keypoint and its (N−1) nearest neighbors is considered as a fingerprint candidate. Each current candidate keypoint Kp is selected sequentially from the input list 1510 by the Get Next Keypoint module 1530. For each keypoint Kp, the Find Nearest Neighbors module 1540 identifies the (N−1) nearest keypoints with the closest distance to the given keypoint Kp, where N is a given parameter. The Find Nearest Neighbors module uses the Delaunay or Keypoint Triangulation result 1520 to return a list of the closest keypoints to Kp, sorted by increasing distance from Kp. The first element of the returned list is always the current keypoint Kp (with a distance of zero). The value of the parameter N is adjusted to provide a reasonable tradeoff between the fingerprint "strength" or distinctiveness, the overall system performance, quantified as the number of computations per fingerprint, and the resulting database size or fingerprint size. In this example the values, N=8, 12, or 16 are used.

The points of the Find Nearest Neighbor module 1540 need to be taken in a consistent order so that sequence of area ratios will be consistent for the same keypoint/neighborhood between database and query images. The Sort in Clockwise Order module 1550 sorts the list of N nearest neighbor keypoints of a given keypoint in increasing clockwise orientation.

The Sort in Clockwise Order module 1550 includes a method and system to stabilize keypoint ordering with respect to the common case of nearly co-linear keypoints. The Sort in Clockwise Order module 1550 uses the first M nearest neighbors, where M<N, on the list (the closest to the given keypoint) to calculate a subgroup center of origin. The farthest (N−M) keypoints are not used in calculation of the subgroup center of origin, in order to ensure that origin will remain stable under affine or perspective transformation. In the present implementation the Sort in Clockwise Order module 1550 uses the average location of M=5, when total N=8, nearest neighbor keypoints as the center of origin for the purpose of determining keypoint ordering.

After determining the origin center of the current neighbor keypoint cluster, the Sort in Clockwise Order module 1550 proceeds to sort the keypoints in increasing clockwise orientation order. The sorting is done on both the orientation and distance. The order is by increasing clockwise orientation order. However, if two or more points have roughly the same orientation, where the difference is within a predefined tolerance level, the points are sub-ordered by increasing distance for all the points of a substantially similar orientation.

For each unique subset of N keypoints, the Next Subgroup Combination module 1560 systematically and methodically selects the next subgroup combination of P=4 or P=5 keypoints depending on affine or perspective transformation case. For example, for N=8 there are 70 unique combinations of P=4 keypoint subgroups.

For each Next Subgroup Combination of P=4 keypoints, the Packed Quantized Ratio module 1570 calculates a single persistent ratio and quantizes it using a set of predefined interval boundary thresholds. The number of quantization levels Q is a design parameter. In these examples, Q=8 or Q=16 are used. The quantization threshold values are determined empirically by studying the distribution of persistent ratios in a large collection of documents of a particular type.

In order to further reduce the size of the Fingerprint Database 1585, the Packed Quantized Ratio module 1570 packs a number of the resulting quantized persistent ratios into one machine word. For example, with N=8, P=4, and Q=8, the entire fingerprint sequence of 70 subgroup combinations can be tightly packed into less than four 64-bit words. In one embodiment of the present application, the size of a packed fingerprint occupies a total of three 64-bit words and three 8-bit bytes with no need to split partial information across multiple words or bytes.

The process of calculating and packing the fingerprints continues sequentially, one persistent ratio at a time, until the last combination is detected by the Last Combination module 1580. If the current P subgroup combination is not yet the last combination 1581, the Last Combination module 1580 routes the flow back to the Next Subgroup Combination module 1560, to obtain the next P subgroup and proceed to calculate its quantized persistent ratio and pack it. This process continues until the last P subgroup combination has been processed 1582. At this time, the resulting packed fingerprint data 1583 is written to the Fingerprint Database 1585. Note that the fingerprint data can be written to the Fingerprint Database 1585 sequentially, one fingerprint at a time, as each packed fingerprint data is becoming available.

Finally, the process of writing the fingerprints continues sequentially for all the remaining keypoints, until the last keypoint is detected by the Last Keypoint module 1590. If the current keypoint combination is not yet the last keypoint 1591, the Last Keypoint module 1590 routes the flow back to the Get Next Keypoint module 1530, to obtain the next keypoint and proceed to repeat the process to calculate its packed fingerprint and adding it to the Fingerprint Database 1585. The Fingerprinting process continues in this manner until the last keypoint combination last corresponding fingerprint has been processed 1592 and added to the Fingerprint Database 1585. Once the last keypoint has been addressed, the process ends 1595.

Figure 16A:
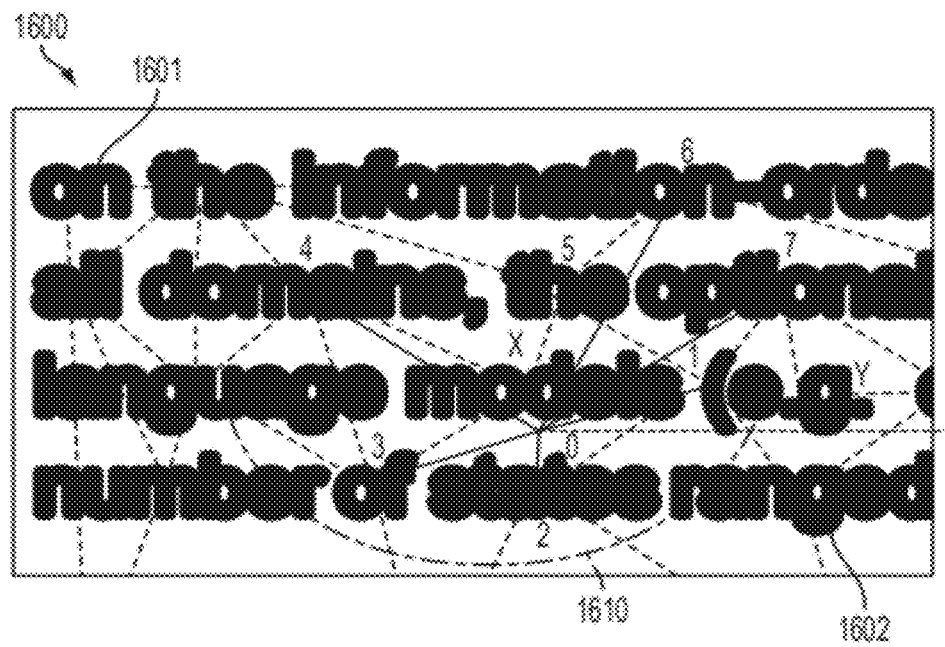
FIGS. 16A and 16B illustrate a method of Sorting of Nearest Neighbor Keypoints in Clockwise orientation order.
Figure 16B:
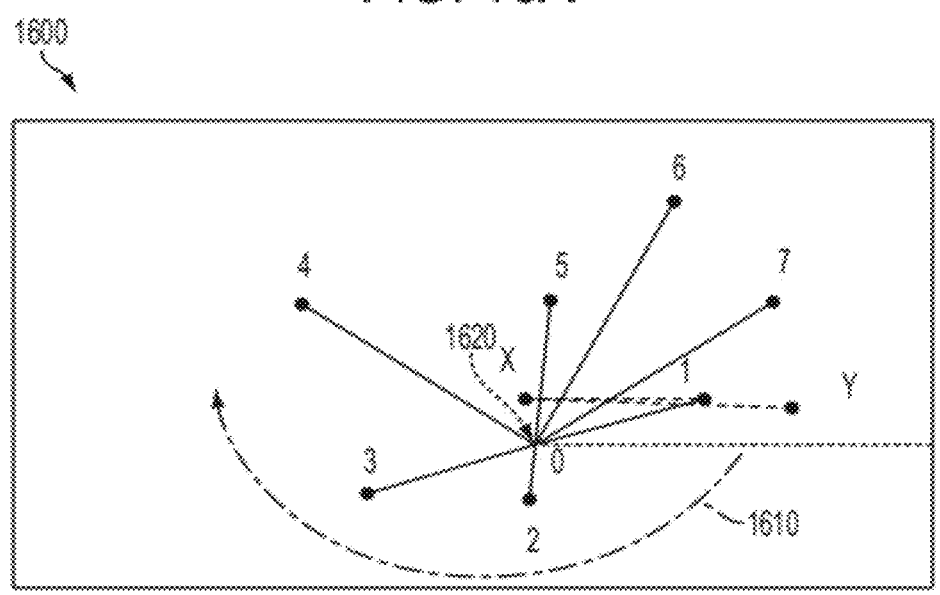
Figure 17:
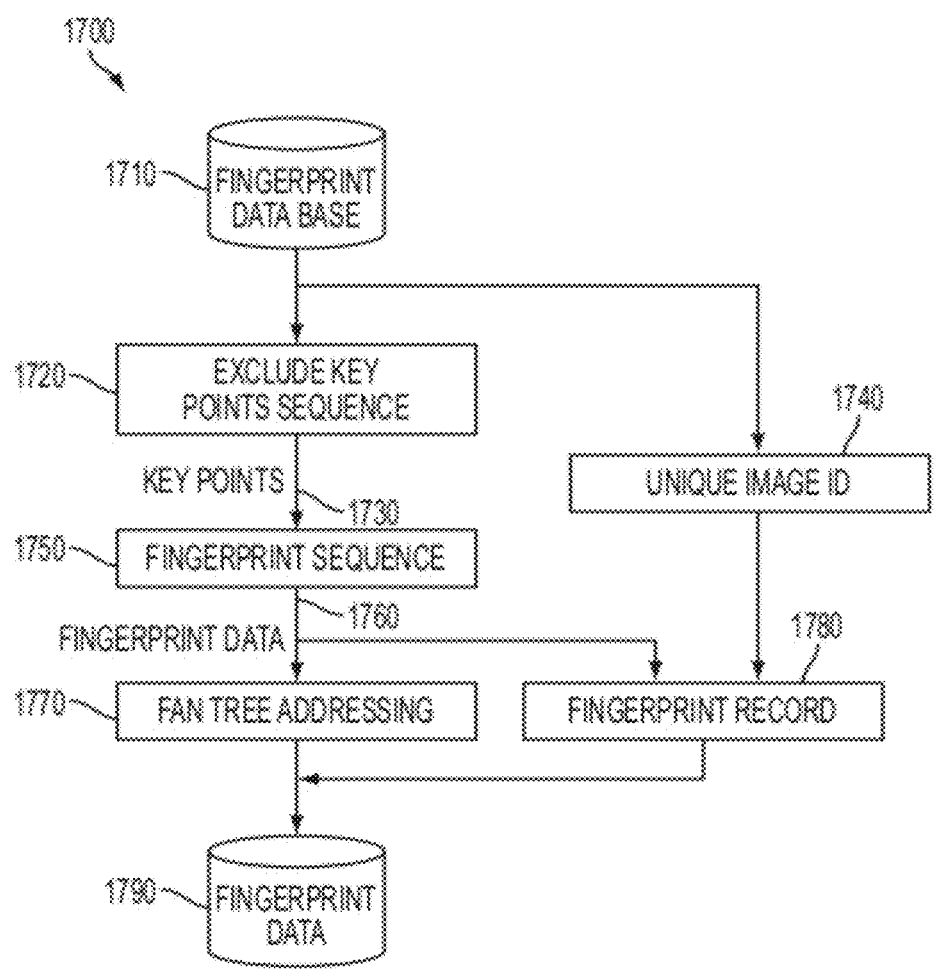
FIG. 17 is a method of building a Fan Tree from the Fingerprint database.

A method of calculating the fingerprint center of origin is illustrated in FIGS. 16A-16B. FIG. 16A illustrates the process with respect to a given example image 1600. The processed image is shown with the keypoints or word centroids identified by circles such as circles 1601-1602. These are set forth only as examples, and the other circles in the figures are also word centroids. For example, numbers (1-7) also represent word centroids which are near neighbor keypoints to point X. FIG. 16B eliminates the background processed image for better clarity, but is otherwise the same as in FIG. 16A. In this example, a fingerprint is computed for the keypoint X, using seven additional keypoints (1-7) in the local neighborhood. In the first step, the center of origin for this fingerprint is calculated using the closest M=5 keypoints to keypoint X, that is, the average location of the points {X, 1, 2, 3 and 5}. This is likely to move the center of origin away from the point X, and away from the co-linear line of keypoint along the text line Y which includes the keypoint X, to a new center of origin following arrow line 1620 to point 0. The three most distant keypoints (4, 6, 7) of the seven (1-7) are not used for the center of origin calculation to stabilize the point 0 location by allowing for up to three (3) points to be shifted by arbitrary affine or perspective transformation. In the second step, the entire set of eight keypoints (X and 1-7) are sorted in clockwise order 1610 with respect to the newly calculated sub-group center of origin (0), resulting in the final output sequence ordering of (1, X, 2, 3, 4, 5, 6, 7) in this case. With attention to the ordering of keypoints, it is to be understood the above-described ordering depends on the point of reference. If "0" is used as the point of reference, the resulting sequence would have been 234X5671 since 1 is above the dotted line from "0". The alternative as used here is to continue to use X as reference, but pretend the keypoint mass is moved to "0", which yields the listed sequence. In the foregoing, the latter has been used, since it keeps the original keypoint location as reference, while the point "0" may move around X and cause the flipping of keypoint sequence order. However, it can be done either way, as what needs to be accomplished, in either case, is to be able to repeat the same sequence in both target and query image. Note that the objective of the second step is to sort in clockwise order, not by distance.

Once the ordering of N nearest neighbor keypoints has been established for a given keypoint, a fingerprint can be generated. Fingerprints are formed from successive subsets of size P=4 of the keypoints in a neighborhood by excluding one or more keypoints at a time and constructing a sequence of the remaining subgroup combinations of non-excluded keypoints. Thus a group of fingerprints can be effectively constructed from the packed sequence of subgroup combinations. P-subsets of the N keypoints are considered in a systematic and consistent manner. For each, an integer is determined by computing the persistent area ratio for that P-subset, and mapping the area ratio to an integer as described herein. The length of a fingerprint for the given keypoint is the total number of such P-subsets. This is determined by the number of combinations for choosing unique P keypoints out of N keypoints. For example, if N=8 and P=4, the number of possible subgroup combinations is 70 persistent ratios. Of these, 8 fingerprints of length 35 subgroup combinations each can be constructed, for example, by excluding one keypoint at a time.

a.3. Preparing Fingerprints Information for Fast Matching

As illustrated in FIG. 15, since the fingerprints in the Fingerprint Database 1585 are stored in a packed format to reduce the memory size and loading time, they must first be unpacked and re-organized in a unique manner in accordance with a Fan Tree data structure to facilitate efficient fingerprint matching. Note that it is only necessary to prepare the Fingerprint Database once, upon the first image query. The Fan Tree data structure (containing the unpacked fingerprint sequences) can be kept in memory and subsequently reused with any number of image queries.

The method of preparation of the packed fingerprint database 1710 has previously been illustrated (FIG. 15). The fingerprint information is retrieved the from the fingerprint database 1710. Each fingerprint database entry gives rise to multiple candidate fingerprints.

The Exclude Keypoint module 1720 selects multiple candidate fingerprint keypoint combinations by excluding one or more of the fingerprint keypoints 1730. This allows for one or more missing keypoints among the local neighborhood keypoints. In the present implementation, the Exclude Keypoint module leaves out one keypoint. With a local neighborhood of N keypoints, this gives rise to N fingerprints for each database entry, or N fingerprints per keypoint since a database entry is made for each keypoint.

The Fingerprint Sequence module 1750 generates the sequence of N candidate fingerprints for each keypoint. For example, when N=8, the Exclude Keypoint module 1720 will cause the first fingerprint to be generated by leaving out the first keypoint and selecting the seven remaining keypoints. After that, the Exclude Keypoint module will leave out the second keypoint and select the first and six last keypoints for creating the second fingerprint. This process continues until all excluded keypoint combinations have been encountered. In this example each database entry will generate 8 candidate fingerprints, each of length 7 choose 4=35.

With N=8 and P=4, there are (8 choose 4)=70 unique combinations of 4 keypoint subgroups. This is what gets stored in the database 1710 in a packed format for each keypoint.

Next fingerprints for the case of a single missing keypoint are generated. However, which keypoint may be missing is not known in advance, so preparation for all possibilities is undertaken. With N=8, there are 8 possible ways of a single missing keypoint: either the first, or the second, or third, etc.—for a total of 8 cases. A different fingerprint for each one of these cases is computed. Each fingerprint in this case is only based on 7 keypoints (because one of the original 8 is missing). Thus the length of each fingerprint in this case is (7 choose 4)=35, and there are 8 of them total. This means that each fingerprint is comprised of a sequence of 35 integers (quantized ratios) in the range 0-7. The 8 fingerprints are added to the Fan Tree data.

At query time, 8 keypoints (current and 7 closest) are generated, and again 8 query fingerprints are computed using the same method, and likewise excluding one keypoint at a time. Then an attempt is made to match the keypoints against the Fan Tree content. Matching is stopped upon the first obtained match. If a single keypoint is missing from the query image (it does not matter which), one of the query fingerprints out of the 8 is bound to have a match (to the one with the 7 other keypoints present). And if no keypoint is missing (all 8 present), then there would be 8 matches (because any group of 7 will match), except the process stops after the first positive match since there is no need to continue checking. If, however, two keypoints or more are missing at the same time, there would be no match for this location. If so desired, the system could easily handle more missing keypoints by extending the method to allow more missing keypoints (e.g., 2 out of 8, etc.).

The Fingerprint Data 1760 output from the Fingerprint Sequence module 1750, together with the unique image ID 1740 that is retrieved from the database for the current image, form a fingerprint record 1780. The fingerprint record 1780 is stored in a corresponding Fan Tree Leaf node location which is addressed by the Fan Tree module 1770. The Fan Tree Leaf node information is stored as a linked list of fingerprint records 1780 in the corresponding Fingerprint Data structure 1790. Only the actual Fan Tree Leaf nodes corresponding to real fingerprints are populated. The first fingerprint to arrive at a particular leaf node populates that leaf node for the first time. If more than one fingerprint happens to arrive at the same leaf node again (i.e., following the same Fan Tree path), the new fingerprint information is added at the same leaf node by linking the new fingerprint information with the last previous fingerprint information on that leaf node.

It is to be understood various ones of the above processes which are used to prepare the page images in the document collection can be similarly used, with some modification, in the query operations. For example, the candidate keypoint identification process of FIG. 13, can similarly be used to identify candidate query keypoints, modified to, for example, include image enhancement. Further, additional processing operations are available to improve the accuracy of the results such as nose-guarding, among others.

While not limited thereto, various aspects of the system and methods described in this application are:
1. A fast and efficient method for automatically finding pages that contains duplicated content of a query image in a large document collection.
2. Enabling a user to quickly and effectively inspect all documents containing partially duplicated content regardless of how the collection is organized.
3. An effective method for automatically highlighting the duplicated content, or the difference thereof, between each found page in the collection and the query image in order to help a human observer visually compare and quickly see the changes.
4. Not requiring a user to actively specify the detail of what content to look for. Instead, the method of this application will automatically find any page in the collection that contains any duplicate content portion of the query image that meets a given minimum fingerprint count.
5. A system and method based on using 2D visual fingerprints, to take advantage of the ability of 2D visual fingerprints to identify duplicate document content with high performance and accuracy, and achieve excellent detection results at a fraction of the complexity and time relative to optical character recognition (OCR).
6. A system and method based on visual fingerprints which reliably handles any document content including handwritten text, annotations, line-art, clip-art, arbitrary text and fonts, tables, charts, company logo, photographs, and other types of marks on page. The use of visual fingerprints extends the duplicate document content field beyond OCR to enable rich data content applications. Unlike OCR, visual fingerprinting can be applied to identify duplicate document content at high accuracy and at a fraction of the computational complexity of OCR and without any dependencies on the content (such as fonts, etc.).
7. An effective method for helping users accomplish complex tasks such as identify duplicate document content in a large document collection, eliminate identical copies, and visually locate and find relevant information in a discovery settings.
8. The automatic highlighting feature allowing a discovery team to quickly eliminate duplicate document copies and easily pinpoint any difference from the query image. The discovery team is relieved from having to inspect multiple copies and duplicate areas of matching corresponding fingerprints, and can therefore focus on the automatically highlighted key areas of difference, and quickly and effectively determine what changes, if any, may be relevant to the ongoing search at hand. Thus the system and method of this application can help streamline the discovery process and save hours of costly, tedious and prone-to-error manual labor.

It will be appreciated that variants of the above-disclosed and other features and functions, or alternatives thereof, may be combined into many other different systems or applications. Various presently unforeseen or unanticipated alternatives, modifications, variations or improvements therein may be subsequently made by those skilled in the art which are also intended to be encompassed by the following claims.

What is claimed is:

1. A method of detecting duplicate document content, the method comprising:
    inputting a query document page to a document detection system;
    comparing the query document page with pages of documents stored in a document collection by using visual fingerprints of a two-dimensional visual fingerprint detection process, wherein the visual fingerprints are at least one of affine and perspective invariant visual fingerprints; and
    automatically highlighting duplicate or different document content of the query document page and at least one document page of the stored documentation collection based on the results of using the two-dimensional visual fingerprint detection;
    wherein the automatically highlighting is accomplished by calculating a mean and standard deviation for two-dimensional locations of each cluster of non-corresponding fingerprints of the query document page and one of the document pages of the document collection; and
    wherein the method is implemented using at least an electronic processor.

2. The method according to claim 1 wherein a list of the documents of the document collection having matching fingerprints to the query document page is returned and the returning of the list of documents having matching fingerprints to the query document page includes forming the list from only documents of the document collection having a predefined required minimum corresponding number of matching fingerprints.

3. The method according to claim 1 wherein clusters of corresponding identical fingerprints in the query document page and one of the documents of the document collection represent regions of matching document content, while clusters of non-corresponding fingerprints represent document content differences.

4. A method of detecting duplicate document content, the method comprising:
    inputting a query document page to a document detection system;
    comparing the query document page with pages of documents stored in a document collection by using visual fingerprints of a two-dimensional visual fingerprint detection process; and automatically highlighting duplicate or different document content of the query document page and at least one document page of the stored documentation collection based on the results of using the two-dimensional visual fingerprint detection, wherein the automatically highlighting includes generating a geometric element for each cluster of non-corresponding fingerprints on at least one of the query document page and one of the document pages of the returned documents of the document collection, wherein the method is implemented using at least an electronic processor.

5. The method according to claim 4 wherein the geometric element is centered at a cluster mean and a size of the geometric element is proportional to estimated second moments of fingerprint location distribution within the cluster.

6. The method according to claim 5 wherein the size of the geometric element is further controlled in proportion to the number and location of any corresponding fingerprints occurring inside or in close proximity to the cluster, and by cluster complexity, shape, and fingerprint density.

7. The method according to claim 4 wherein the geometric element is drawn or super-imposed on top of the visual image display in a highlight color, or is saved in a separate image layer of metadata.

8. The method according to claim 1 wherein the document collection includes at least one of electronically created documents and/or scanned versions of hardcopy documents.

9. The method according to claim 1 wherein the document collection is an abstract logical document collection that may be physically distributed in a set of sub-collections across any one of a number of folders, drives systems, networks, remote servers, web-servers, and/or cloud storage facilities.

10. A method of detecting duplicate document content, the method comprising:
inputting a query document page to a document detection system;
comparing the query document page with pages of documents stored in a document collection by using visual fingerprints of a two-dimensional visual fingerprint detection process;
storing the visual fingerprints in a fingerprint lookup index and incrementally updating the fingerprint lookup index when documents are added to the document collection or when documents are deleted from the document collection, wherein the fingerprint lookup index is formed by processing a sequence of page images, computing the visual fingerprints; and adding the visual fingerprints and their locations to the fingerprint lookup index, and
automatically highlighting duplicate or different document content of the query document page and at least one document page of the stored documentation collection based on the results of using the two-dimensional visual fingerprint detection
wherein the method is implemented using at least an electronic processor.

11. A method of detecting duplicate document content in a large document collection and automatically highlighting duplicate or different document content among the detected document content using two-dimensional visual fingerprints, the method comprising:
generating a document collection;
visually fingerprinting documents of the document collection;
indexing the fingerprinted documents of the document collection;
storing in memory the indexed fingerprints of the documents of the document collection;
presenting a query document to a content detection system;
fingerprinting the query document;
looking up the fingerprints of the query document in the memory storing the indexed fingerprints of the documents of the document collection;
returning a list of documents of the document collection having fingerprints matching the fingerprints of the query document;
performing a fingerprint comparison for each document of the document collection having matching fingerprints to the query document, wherein the comparison includes comparing the fingerprint locations and their corresponding layout in the documents being compared; and
automatically highlighting one of the duplicate or non-duplicate document content between the query document and the one of the documents of the document collection, wherein the method is implemented using at least an electronic processor.

12. The method according to claim 11 wherein the document collection includes at least one of electronically created documents and/or scanned versions of hardcopy documents.

13. The method according to claim 11 wherein the document collection is an abstract logical document collection that may be physically distributed in a set of sub-collections across any one of a number of folders, drives systems, networks, remote servers, web-servers, and/or cloud storage facilities.

14. The method according to claim 11 wherein the stored fingerprint lookup index is incrementally updated when documents are added to the document collection or when documents are deleted from the document collection.

15. The method according to claim 11 wherein the returning of the list of documents having matching fingerprints to the query document includes forming the list from only documents having a predefined required minimum of corresponding matching fingerprints.

16. The method according to claim 11 wherein sets of corresponding identical fingerprints in the query document and one of the documents of the document collection represent regions of matching document content, while clusters of non-corresponding fingerprints in either image document represent document content differences.

17. The method according to claim 11 wherein the indexing includes: processing a sequence of page images, computing visual fingerprints; and adding the visual finger prints and their locations to the fingerprint lookup index.

18. A computer-readable medium having computer-executable instructions for detecting duplicate document content, comprising:
receiving a query document page;
holding a plurality of documents in a document collection storage;
comparing two-dimensional fingerprints of the query document page with two-dimensional fingerprints of pages of the documents in the document collection storage using a two-dimensional visual fingerprint comparison module, wherein the visual fingerprints are at least one of affine and perspective invariant visual fingerprints, and
automatically highlighting duplicate or different document content of the query document page and at least one document page of the stored documentation collection using a highlighting module, based on the results from the two-dimensional visual fingerprint comparison module;

wherein the automatically highlighting is accomplished by calculating of a mean and standard deviation for two-dimensional locations of each cluster of non-corresponding fingerprints of the query document page and one of the document pages of the document collection.

19. The method according to claim 1 wherein the visual two-dimensional fingerprints are organized and stored in a memory in a fan-tree data structure.

\* \* \* \* \*

UNITED STATES PATENT AND TRADEMARK OFFICE
CERTIFICATE OF CORRECTION

PATENT NO. : 8,750,624 B2  
APPLICATION NO. : 12/907226  
DATED : June 10, 2014  
INVENTOR(S) : Doron Kletter It is certified that error appears in the above-identified patent and that said Letters Patent is hereby corrected as shown below:

ON THE TITLE PAGE

Change Item 76 to read Item 75

Insert Item 73 Assignee: --Palo Alto Research Center Incorporated, Palo Alto, CA (US)--

Signed and Sealed this  
Sixteenth Day of February, 2016

Michelle K. Lee  
*Director of the United States Patent and Trademark Office*